(12) United States Patent
Sakurai

(10) Patent No.: US 7,969,539 B2
(45) Date of Patent: Jun. 28, 2011

(54) ELECTRO-OPTICAL DEVICE, INPUT DEVICE, AND ELECTRONIC APPARATUS

(75) Inventor: Shinji Sakurai, Matsumoto (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 12/420,075

(22) Filed: Apr. 8, 2009

(65) Prior Publication Data
US 2009/0257010 A1 Oct. 15, 2009

(30) Foreign Application Priority Data

Apr. 11, 2008 (JP) ................................. 2008-103103

(51) Int. Cl.
- *G02F 1/295* (2006.01)
- *G02F 1/01* (2006.01)
- *G02F 1/03* (2006.01)
- *G02F 1/1339* (2006.01)

(52) U.S. Cl. .......................... 349/110; 385/147; 359/245
(58) Field of Classification Search .................. 359/245, 359/246, 252, 253, 265; 349/110, 111, 114, 349/44, 49, 42, 74; 385/147
See application file for complete search history.

(56) References Cited

U.S. PATENT DOCUMENTS

| | | | | |
|---|---|---|---|---|
| 5,102,497 A | * | 4/1992 | Hamaguchi et al. ............ | 216/54 |
| 6,339,461 B1 | * | 1/2002 | Kashiwazaki et al. ......... | 349/155 |
| 6,498,672 B2 | * | 12/2002 | Saitoh ............................ | 359/245 |
| 6,798,959 B2 | * | 9/2004 | Takeuchi et al. ............... | 385/120 |
| 7,446,837 B2 | * | 11/2008 | Nakano et al. ................. | 349/114 |
| 7,741,769 B2 | * | 6/2010 | Hayashi ......................... | 313/498 |
| 2006/0257609 A1 | * | 11/2006 | Winter ........................... | 428/40.1 |
| 2007/0065091 A1 | | 3/2007 | Hinata et al. | |
| 2008/0311369 A1 | * | 12/2008 | Yokoyama et al. ............ | 428/220 |

FOREIGN PATENT DOCUMENTS

| | | |
|---|---|---|
| JP | 2004-101636 | 4/2004 |
| JP | 2004-272059 | 9/2004 |
| JP | 2006-290960 | 10/2006 |

* cited by examiner

*Primary Examiner* — Akm E Ullah
(74) *Attorney, Agent, or Firm* — K&L Gates LLP

(57) ABSTRACT

An electro-optical device includes: an electro-optical panel; a light-transmissive member that overlaps the electro-optical panel and has a protruding part that protrudes so as to be positioned outside an edge of the electro-optical panel, the light-transmissive member having a first area and a second area that is located outside the first area; a coloration layer that is formed on a surface of the light-transmissive member at the second area; an adhesive material that is provided between a part of the coloration layer and a corresponding part of the electro-optical panel as well as between the part of the light-transmissive member and a corresponding part of the electro-optical panel; and a first light-shielding layer formed over one surface of the light-transmissive member, and the first light-shielding layer being formed at an area where the coloration layer does not overlap the adhesive material in a plan view.

12 Claims, 10 Drawing Sheets

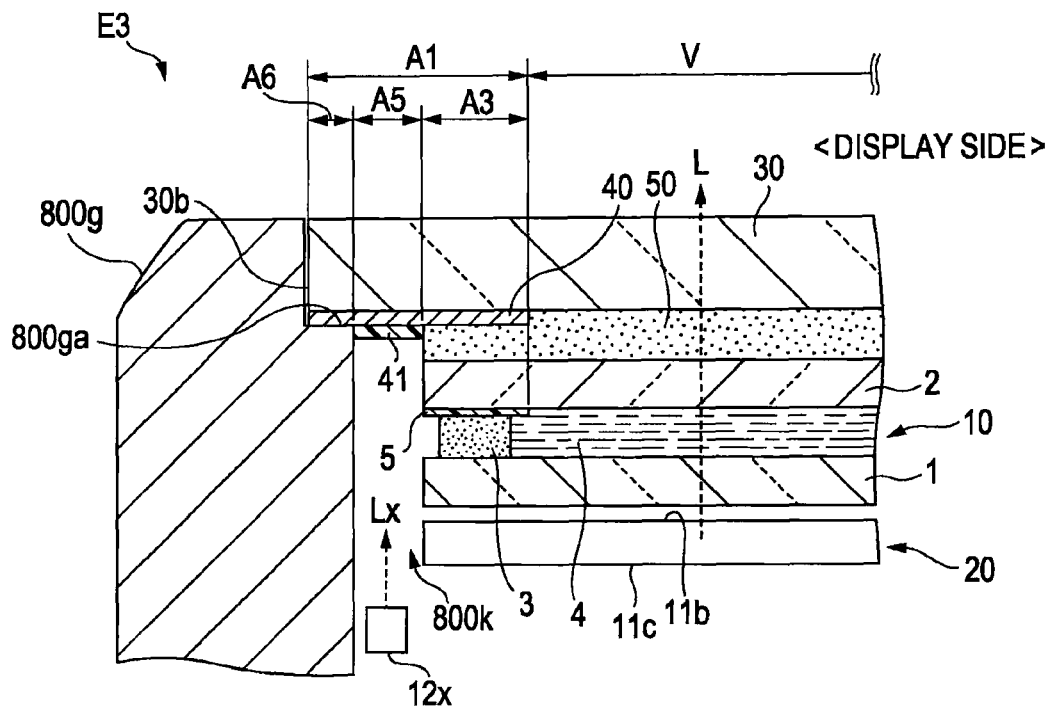
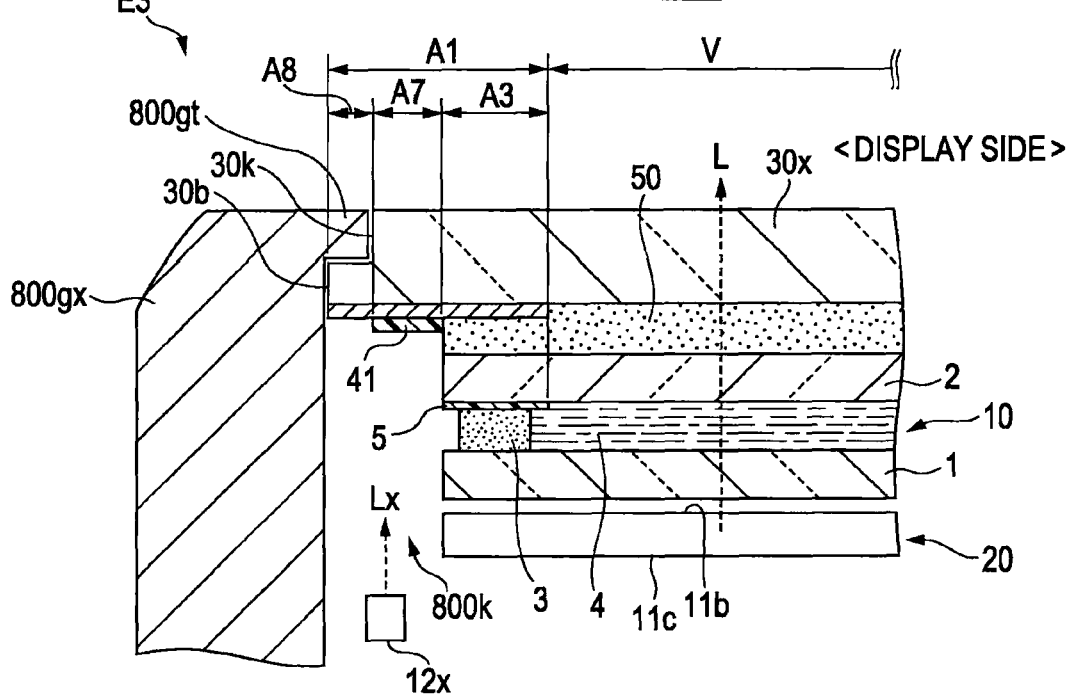

ELECTRO-OPTICAL DEVICE, INPUT DEVICE, AND ELECTRONIC APPARATUS

BACKGROUND

1. Technical Field

The present invention relates to the structure of an electro-optical device that includes an electro-optical panel and a light-transmissive member that overlaps the electro-optical panel when viewed in plan, though not limited thereto.

2. Related Art

An electro-optical device is used in a variety of electronic apparatuses such as a mobile phone, a personal digital assistance, and the like for the purpose of displaying video information such as images.

An example of such an electro-optical device is a liquid crystal display device that is provided with a liquid crystal display panel, which is made up of a pair of substrates and liquid crystal that is sandwiched and sealed between the pair of substrates. A liquid crystal display panel is vulnerable to an external force such as a pressing force, a shock, and the like that is applied from the outside. In order to protect a weak liquid crystal display panel against an external force, a transparent protection cover is provided at the image-display side of the liquid crystal display panel. If a layer of air exists between the transparent protection cover and the liquid crystal display panel in such a configuration, light is diffused due to a difference in the index of refraction between these media, which results in degradation in display quality.

An image display device that can prevent such degradation in display quality from occurring is disclosed in JP-A-2006-290960. In the configuration of an image display device that is described in JP-A-2006-290960, a light-transmissive adhesion sheet that is made of a transparent gel having a predetermined gel pattern is provided between the liquid crystal display panel and the transparent protection cover. By this means, it is possible to achieve high shock absorption property without decreasing visual performance. In addition, techniques that are related to the art explained above are described in JP-A-2004-101636 and JP-A-2004-272059.

In a typical configuration of an electro-optical device of related art, a black pattern is printed at a peripheral edge part on one surface of the transparent protection cover that faces toward the liquid crystal display panel and/or is closer to the liquid crystal display panel than the other opposite surface thereof. Specifically, the black pattern is provided for preventing the leakage of a beam of light coming from a side at which the liquid crystal display panel is provided. The one surface mentioned above may be hereafter referred to as liquid-crystal-display-panel-side surface. The side at which the liquid crystal display panel is provided may be hereafter referred to as liquid-crystal-display-panel side. The black pattern has a single-layer structure. The black pattern is formed as a film layer that is thin enough so as not to allow optical leakage. Since the black pattern is formed as a thin layer, a difference in level between the surface of the transparent protection cover at an area at which the black pattern is printed and the surface thereof at an area at which the black pattern is not printed is small. In addition, the light-transmissive adhesion sheet is made of a material that can be elastically deformed and has shock-absorbing property. Because of the structure explained above, there is almost no possibility that air bubbles, which cause degradation in display quality, are produced at the level-difference area part when the transparent protection cover is bonded to the light-transmissive adhesion sheet that has been pre-bonded to a bonding surface of the liquid crystal display panel or when the light-transmissive adhesion sheet is bonded to the transparent protection cover before it is bonded to the bonding surface of the liquid crystal display panel.

In order to make the design of a transparent protection cover more sophisticated, these days, there is a demand for a light-color printed pattern that is not the black printed pattern at a peripheral edge part on the liquid-crystal-display-panel-side surface of the transparent protection cover. However, if such a light-color printed pattern is adopted, inner components provided at the liquid-crystal-display-panel side may be seen through when observed from the peripheral edge part of the transparent protection cover, which is not desirable. In order to prevent the inner components provided at the liquid-crystal-display-panel side from being seen through, it is necessary to form a dark-color pattern in such a manner that the dark-color pattern overlaps at least a part of the light-color pattern for the shielding of light.

If such a configuration is adopted, overlapping layers that are made up of a design color pattern and a dark pattern, the latter of which is printed so as to overlap at least a part of the former for see-through prevention, are formed. Therefore, a difference in level between the surface of the transparent protection cover at an area at which the dual-layer pattern is printed and the surface thereof at an area at which the pattern is not printed at all is relatively large. Because of such a relatively large level difference, it is more likely that air bubbles are produced at the level-difference area part when the transparent protection cover is bonded to the light-transmissive adhesion sheet that has been pre-bonded to the bonding surface of the liquid crystal display panel or when the light-transmissive adhesion sheet is bonded to the transparent protection cover before it is bonded to the bonding surface of the liquid crystal display panel. In addition, it is difficult to make the air bubbles escape to the outside. If any air bubble remains without being removed at the level-difference area part, there is a risk that display quality is adversely affected due to a difference in the index of refraction of the air bubble and the index of refraction of the light-transmissive adhesion sheet and the like.

Moreover, since a large level difference is formed on the transparent protection cover, a distance between the transparent protection cover and the liquid crystal display panel is also large. Therefore, there is an adverse possibility that a stress is applied to the liquid crystal display panel in a direction of pulling the liquid crystal display panel toward the transparent protection cover due to the adhesion force of the light-transmissive adhesion sheet when the liquid crystal display panel and the transparent protection cover are bonded to each other with the use of the light-transmissive adhesion sheet. In addition, there is an adverse possibility that a stress that causes the liquid crystal display panel to be deflected under the pulling force is applied to the liquid crystal display panel. For this reason, display unevenness or other image problems might occur at the time of the driving of the liquid crystal display panel due to the deflection thereof, which results in degradation in display quality.

SUMMARY

An advantage of some aspects of the invention is to provide an electro-optical device that makes it possible to prevent the leakage of light from a liquid-crystal-display-panel side to a display side and further prevent the degradation of display quality while enhancing the design quality of a light-transmissive member by means of a coloration layer when the light-transmissive member on which the coloration layer is formed for improving design quality is used. The invention further provides, as an advantage of some aspects of the invention, an electronic apparatus that is provided with such an electro-optical device.

In order to address the above-identified problems without any limitation thereto, an electro-optical device according to a first aspect of the invention includes: an electro-optical panel that has an effective display area; a light-transmissive member that overlaps the electro-optical panel in a plan view and has a protruding part that protrudes so as to be positioned outside an edge of the electro-optical panel, the light-transmissive member having a first area that corresponds to the effective display area of the electro-optical panel and a second area that is located outside the first area; a coloration layer that is formed on a surface of the light-transmissive member at the second area; an adhesive material that is provided between a part of the coloration layer and a corresponding part of the electro-optical panel as well as between the first-area part of the light-transmissive member and a corresponding part of the electro-optical panel so as to offer tight adhesive contact therebetween; and a first light-shielding layer that is formed over one surface of the light-transmissive member that faces toward the electro-optical panel and/or is closer to the electro-optical panel than the other opposite surface thereof at an area where the coloration layer does not overlap the adhesive material at all in a plan view.

An electro-optical device according to the first aspect of the invention described above is provided with an electro-optical panel, a light-transmissive member, a coloration layer, and an adhesive material. The electro-optical panel may be embodied as and/or applied to various kinds of well-known display devices including but not limited to an organic electroluminescence (EL) display device, electronic paper, a plasma display device, or a field emission display device. The electro-optical panel has an effective display area, which is an area that contributes to image display. The light-transmissive member is made of a material that has light-transmitting property. For example, the light-transmissive member is a light-transmissive protection plate that protects the electro-optical panel against an external force, which is applied from the outside. Or, the light-transmissive member is a touch panel. As another example, the light-transmissive member includes a touch panel and a light-transmissive protection plate that protects the touch panel against an external force, which is applied from the outside. It is preferable that the dimension of the light-transmissive member should be larger than that of the electro-optical panel so that a peripheral edge part of the light-transmissive member is positioned outside the edge of the electro-optical panel as a protruding part. The coloration layer is formed at an area outside the effective display area on a surface of the light-transmissive member in order to enhance the design quality of the light-transmissive member, for example, in order to make the design of the light-transmissive member more sophisticated. For example, the coloration layer is formed on one surface of the light-transmissive member that faces toward the electro-optical panel and/or is closer to the electro-optical panel than the other opposite surface thereof. The one surface mentioned above may be hereafter referred to as electro-optical-panel-side surface. Or, the coloration layer is formed on the other surface of the light-transmissive member that is opposite to the electro-optical-panel-side surface thereof. The coloration layer is formed on the light-transmissive member by means of a well-known method such as a screen-printing method, a vapor deposition method, a photolithography method, or the like. The coloration layer is formed to be as thin as possible to the extent that color-rendering properties are not sacrificed. The coloration layer has, for example, a single color pattern or a monochrome pattern. Or, the coloration layer has a pattern that includes a plurality of colors. The pattern of the coloration layer may be made up of characters, figures, symbols, and the like. Or, the coloration layer pattern may be any combination of the foregoing. The adhesive material is a transparent member by means of which the electro-optical panel and the light-transmissive member adhere to each other. The adhesive material is provided between a part of the coloration layer and a corresponding part of the electro-optical panel as well as between the first-area part of the light-transmissive member and a corresponding part of the electro-optical panel so as to offer tight adhesive contact therebetween. For example, the adhesive material is provided as an adhesive layer between the electro-optical panel and the light-transmissive member partially at an area where the coloration layer does not overlap the first light-shielding layer and partially at the effective display area where the light-transmissive member does not overlap the coloration layer so as to keep the electro-optical panel and the light-transmissive member in tight adhesive contact with each other. It is preferable that the adhesive material should have shock-absorbing property so that it can absorb an external force, which is applied from the outside. Moreover, it is preferable that the adhesive material should be made of a substance that can be elastically deformed to some degree. A few examples of the material of the adhesive member are an acrylic gluing agent, a silicon gluing agent, or an epoxy gluing agent.

In the configuration of an electro-optical device according to the first aspect of the invention described above, the first light-shielding layer is formed over the electro-optical-panel-side surface of the light-transmissive member at an area where the coloration layer does not overlap the adhesive material at all in a plan view. It is preferable that an electro-optical device according to the first aspect of the invention described above should further include an illumination device that is provided at one surface side of the electro-optical panel that is opposite to the other surface side thereof that faces toward the light-transmissive member and/or is closer to the light-transmissive member than the one surface side, the illumination device being provided with "a" light source, that is, at least one light source. The other surface of the electro-optical panel that faces toward the light-transmissive member and/or is closer to the light-transmissive member may be hereafter referred to as light-transmissive-member-side surface.

With the configuration of an electro-optical device according to the first aspect of the invention described above, even when a beam of leakage light that comes from the illumination device propagates toward an area part of the coloration layer at which the coloration layer does not overlap the adhesive material at all in a plan view during the operation of the electro-optical device, the first light-shielding layer that is formed to overlap the area part of the coloration layer shuts off the leaked beam of light. Therefore, it is possible to prevent a beam of light from leaking toward the display side at the area part of the coloration layer. Therefore, it is possible to avoid, or at least reduce, the deterioration of the color-rendering properties of the coloration layer. Consequently, the design quality of the light-transmissive member is enhanced by means of the coloration layer.

In addition, in the configuration of an electro-optical device according to the first aspect of the invention described above, the adhesive material is provided between a part of the coloration layer and a corresponding part of the electro-optical panel as well as between the first-area part of the light-transmissive member and a corresponding part of the electro-optical panel so as to offer tight adhesive contact therebetween. Therefore, almost no air bubble is produced and remains without being removed between the light-transmissive member, the electro-optical panel, and the adhesive material. For this reason, it is possible to avoid poor display quality due to a difference in the index of refraction of any air bubble and the index of refraction of the light-transmissive member and the like.

For example, if the coloration layer is formed on the other surface of the light-transmissive member that is opposite to the electro-optical-panel-side surface thereof, the coloration layer and the first light-shielding layer do not exist between the adhesive material and the light-transmissive member. In other words, there is not any level difference between the adhesive material and the light-transmissive member because the coloration layer and the first light-shielding layer do not exist between the adhesive material and the light-transmissive member in such an exemplary layer structure that is explained in the preceding sentence. Therefore, when the light-transmissive member and the electro-optical panel are bonded to each other by means of the adhesive material, it is substantially less likely that air bubbles are produced between the light-transmissive member and the adhesive material. For this reason, it is possible to avoid poor display quality due to a difference in the index of refraction of any air bubble and the index of refraction of the light-transmissive member and the like.

On the other hand, the following explanation applies or holds true when the coloration layer is formed on the electro-optical-panel-side surface of the light-transmissive member. As explained above, the coloration layer, which has, for example, a single-layer structure, is formed to be as thin as possible to the extent that color-rendering properties are not sacrificed. Therefore, a difference in level between the surface of a part of the coloration layer and the surface of the light-transmissive member at an area where the coloration layer is not formed is small. In addition, in a preferred configuration example, the adhesive material is made of a substance that can be elastically deformed to some degree. Therefore, when the light-transmissive member and the electro-optical panel are bonded to each other by means of the adhesive material, it is substantially less likely that air bubbles are produced at the level-difference area part. For this reason, it is possible to avoid poor display quality due to a difference in the index of refraction of any air bubble and the index of refraction of the light-transmissive member and the like.

Moreover, since the level difference is small, a distance between the light-transmissive member and the electro-optical panel is not large. Therefore, there is no risk at all or almost no risk that a stress is applied to the electro-optical panel in a direction of pulling the electro-optical panel toward the light-transmissive member due to the adhesion force of the adhesive material when the light-transmissive member and the electro-optical panel are bonded to each other with the use of the adhesive material. In addition, no stress that causes the electro-optical panel to be deflected under the pulling force is applied to the electro-optical panel. For this reason, it is possible to avoid the occurrence of display unevenness or other image problems due to the deflection of the electro-optical panel. Thus, it is further possible to prevent the quality of display images from being adversely affected thereby.

In the configuration of an electro-optical device according to the first aspect of the invention described above, it is preferable that the electro-optical panel should include a second light-shielding layer that is formed at an area so as to partially overlap the coloration layer when viewed in plan.

With the configuration of the electro-optical panel explained above, even when a beam of leakage light that comes from the illumination device propagates toward the coloration layer during the operation of the electro-optical device, the first light-shielding layer and the second light-shielding layer that are formed to completely overlap the coloration layer shut off the leaked beam of light so as to offer "perfect shielding", which will be defined later in the description of exemplary embodiments of the invention. Therefore, it is possible to prevent a beam of light from leaking toward the display side at the area corresponding to the coloration layer. Accordingly, it is possible to avoid, or at least reduce, the deterioration of the color-rendering properties of the coloration layer with greater effects. Consequently, the design quality of the light-transmissive member is further enhanced by means of the coloration layer. It should be particularly noted that the first light-shielding layer and the second light-shielding layer are not limited to one that shuts light off perfectly. That is, a light-shielding layer that shuts light off but allows a small amount of light to be transmitted may be used as the first light-shielding layer and/or the second light-shielding layer. Even in such a case, the configuration explained above contributes to the improvement in design quality.

In the preferred configuration of an electro-optical device described above, it is further preferable that the illumination device should include a third light-shielding layer that is formed at an area so as to partially overlap the coloration layer when viewed in plan.

With the preferred configuration of an electro-optical device described above, even when a beam of leakage light that comes from the illumination device propagates toward the coloration layer during the operation of the electro-optical device, the third light-shielding layer that is formed at an area so as to partially overlap the coloration layer when viewed in plan shuts off the leaked beam of light. Therefore, it is possible to prevent a beam of light from leaking toward the display side at the area corresponding to the coloration layer. Accordingly, it is possible to avoid, or at least reduce, the deterioration of the color-rendering properties of the coloration layer. Consequently, the design quality of the light-transmissive member is enhanced by means of the coloration layer.

In the preferred configuration of an electro-optical device in which the electro-optical panel includes the second light-shielding layer, it is further preferable that the first light-shielding layer and the second light-shielding layer should partially overlap each other when viewed in plan. In the preferred configuration of an electro-optical device in which the illumination device includes the third light-shielding layer, it is further preferable that the first light-shielding layer and the third light-shielding layer should partially overlap each other when viewed in plan.

With such a configuration, even in a case where a slight positional shift such as a positional deviation or a positional error in the relative positions of the first light-shielding layer and the second light-shielding layer or in the relative positions of the first light-shielding layer and the third light-shielding layer occurs during the process of manufacturing an electro-optical device due to the mechanical position determination performance of a manufacturing apparatus that is used for manufacturing the electro-optical device, it is possible to avoid such a positional shift in the relative positions of the first light-shielding layer and the second light-shielding layer or in the relative positions of the first light-shielding layer and the third light-shielding layer from forming a gap area at which the coloration layer only is provided between the area of the first light-shielding layer and the area of the second light-shielding layer or between the area of the first light-shielding layer and the area of the third light-shielding layer. With the configuration of the electro-optical panel explained above, even when a beam of leakage light that comes from the illumination device propagates toward the coloration layer during the operation of the electro-optical device, the first light-shielding layer and the second light-shielding layer that are formed to overlap the coloration layer when viewed in plan or the first light-shielding layer and the third light-shielding layer that are formed to overlap the coloration layer when viewed in plan shut off the leaked beam of light so as to offer perfect shielding. Therefore, it is possible to prevent a beam of light from leaking toward the display side at the area corresponding to the coloration layer. Thus, it is possible to avoid the deterioration of the color-rendering properties of the coloration layer.

In the preferred configuration of an electro-optical device described above, it is further preferable that the electro-optical panel should include a pair of substrates and an electro-optical material that is sandwiched between the pair of substrates; and the second light-shielding layer should be formed on at least one of the pair of substrates.

In order to address the above-identified problems without any limitation thereto, an electronic apparatus according to a second aspect of the invention includes the electro-optical device according to the first aspect of the invention, where the electro-optical device functions as a display section of the electronic apparatus.

In order to address the above-identified problems without any limitation thereto, an electronic apparatus according to a third aspect of the invention includes: the electro-optical device; a frame that supports a peripheral edge part of the light-transmissive member; and another light source that is provided inside the frame, wherein a gap is formed between the frame and the electro-optical panel; another light source mentioned above is provided at a position corresponding to the gap; and at least a part of the first light-shielding layer is provided at an area that at least covers the gap.

With such a configuration, it is possible to perfectly shield a beam of leakage light that was emitted from another light source mentioned above and propagates toward the display side by means of at least a part of the first light-shielding layer that is provided at the area that at least covers the gap mentioned above. Therefore, it is possible to prevent the beam of leakage light from being transmitted through the coloration layer. Consequently, it is possible to avoid the deterioration of the color-rendering properties of the coloration layer and to improve the design quality of the light-transmissive member by means of the coloration layer.

In connection with an aspect of the invention, the concept can be applied to an input device. The input device includes a touch panel and a transparent protection cover that are pasted or bonded in any other way to each other. A part of the transparent protection cover protrudes when viewed from the touch panel. That is, the protruding part of the transparent protection cover is positioned outside an edge of the touch panel. A coloration layer is provided as a decoration layer or other design enhancement layer at the area of the protruding part on one surface of the transparent protection cover that faces toward the touch panel and/or is closer to the touch panel than the other opposite surface thereof. The one surface mentioned above may be hereafter referred to as touch-panel-side surface. When light is irradiated from the touch-panel side toward the coloration layer, the color-rendering properties of the coloration layer deteriorate. Because of the deterioration of the color-rendering properties of the coloration layer, the decoration layer looks bad, which is one problem of related art.

In order to address such a problem without any limitation thereto, as a non-limiting application example of one concept of the invention to an input device, an input device according to an aspect of the invention includes: a touch panel that has an input area; a light-transmissive protection plate that protects the touch panel against an external force, which is applied from the outside, and has a protruding part that protrudes so as to be positioned outside an edge of the touch panel, the light-transmissive protection plate having a first area that corresponds to the input area of the touch panel and a second area that is located outside the first area; a coloration layer that is formed on a surface of the light-transmissive protection plate at the second area; an adhesive material that is provided between a part of the coloration layer and a corresponding part of the touch panel as well as between the first-area part of the light-transmissive protection plate and a corresponding part of the touch panel so as to offer tight adhesive contact therebetween; and a first light-shielding layer that is formed over one surface of the light-transmissive protection plate that faces toward the touch panel and/or is closer to the touch panel than the other opposite surface thereof at an area where the coloration layer does not overlap the adhesive material at all in a plan view.

With such a configuration, even when light is irradiated from the touch-panel side toward the coloration layer, the first light-shielding layer prevents the deterioration of the color-rendering properties of the coloration layer. Consequently, the design quality of the light-transmissive protection plate is enhanced by means of the coloration layer.

BRIEF DESCRIPTION OF THE DRAWINGS

The invention will be described with reference to the accompanying drawings, wherein like numbers reference like elements.

FIG. 3 shows an example of the two-dimensional configuration of the liquid crystal device viewed from a display side.

FIG. 8A is an enlarged sectional view that schematically illustrates an example of the essential components of a liquid crystal device according to another modification example of an exemplary embodiment of the invention; specifically, FIG. 8A shows a partial section that corresponds to a section area E3 shown by a dotted line in FIG. 2.

FIG. 8B is an enlarged sectional view that schematically illustrates an example of the essential components of a liquid crystal device according to still another modification example of an exemplary embodiment of the invention; specifically, FIG. 8B shows a partial section that corresponds to the section area E3 shown by the dotted line in FIG. 2.

DESCRIPTION OF EXEMPLARY EMBODIMENTS

With reference to the accompanying drawings, exemplary embodiments of the invention including the best mode for carrying out the invention will now be explained in detail.

Electronic Apparatus

Figure 1:
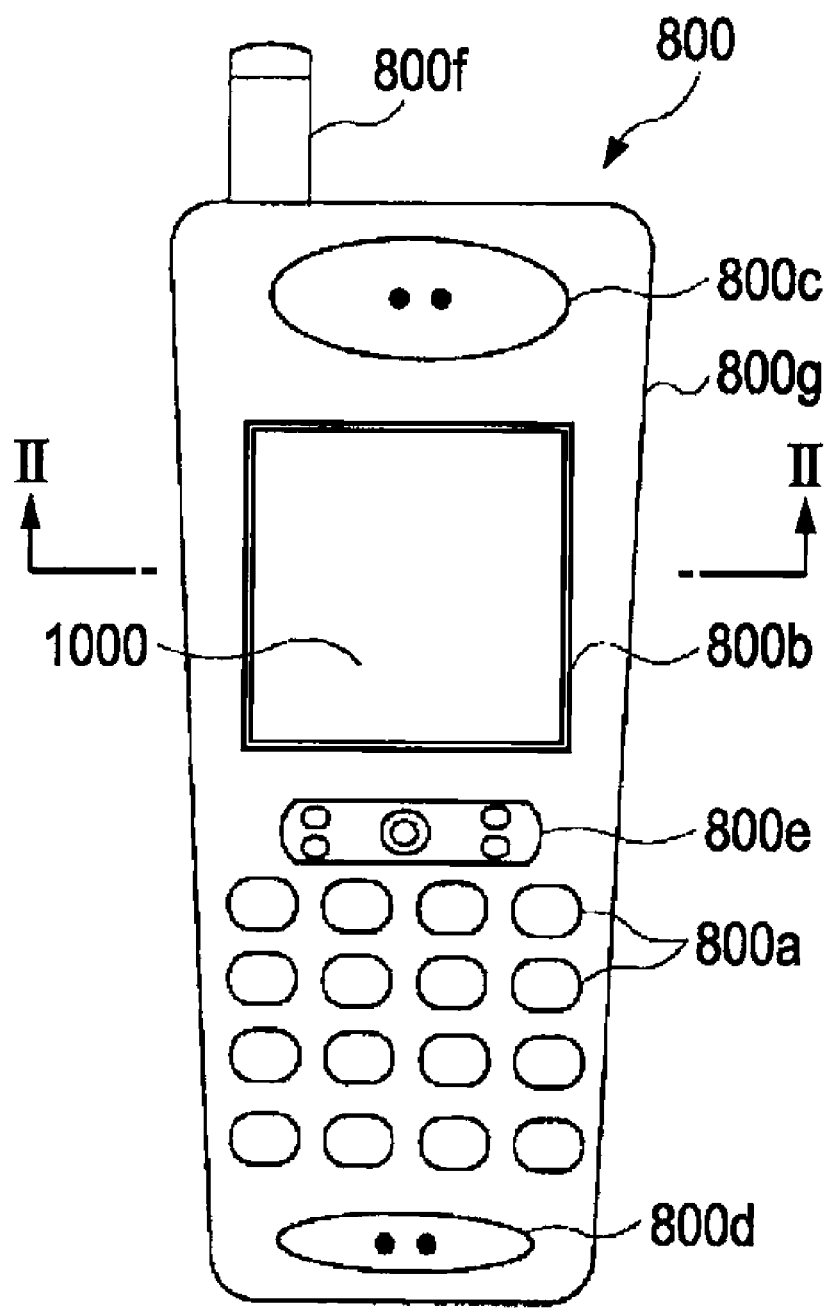
FIG. 1 is a front view that schematically illustrates an example of the configuration of a mobile phone, which is an example of an electronic apparatus that is provided with a liquid crystal device according to an embodiment of the invention.

First of all, an example of an electronic apparatus according to an embodiment of the invention is described while referring to FIG. 1.

FIG. 1 is a front view that schematically illustrates an example of the configuration of a mobile phone 800, which is an example of an electronic apparatus according to an embodiment of the invention, as viewed from the display side, that is, viewed from a frontal viewpoint taken over a display surface on which an image display unit 800b is provided.

The mobile phone 800 is provided with a plurality of operation buttons 800a, the display unit 800b, an earpiece 800c, a mouthpiece 800d, a set of function buttons 800e, a transmission/reception antenna 800f, and a case 800g. The plurality of operation buttons 800a, which is used for, for example, e-mail input operation, is provided on the front surface of the case 800g. The display unit 800b displays various kinds of visual information and content such as texts, characters, figures, photos, and the like as display images. The set of function buttons 800e is used for various functional setting. The transceiver antenna 800f is provided on one side face of the case 800g. The case 800g that is described herein is a non-limiting example of a frame according to an aspect of the invention. A liquid crystal device 1000 is encased in the case 800g at a position that corresponds to the position of the display unit 800b. The liquid crystal device 1000 that is described herein is a non-limiting example of an electro-optical device according to an aspect of the invention. The liquid crystal device 1000 can be embodied as any of liquid crystal devices 100, 100a, 100b, 100c, 100d, 100e, and 100f, each of which will be explained later. When a user depresses the operation buttons 800a and/or the function buttons 800e, images are displayed on the image display unit 800b through the operation of the liquid crystal device 1000. In this way, the mobile phone 800 can perform image display.

Among a variety of electronic apparatuses to which the liquid crystal device 1000 described above is applicable are, in addition to the mobile phone 800 illustrated in FIG. 1, a personal computer, a liquid crystal television, a video tape recorder of a viewfinder type or a direct monitor view type, a car navigation device, a pager, an electronic personal organizer, an electronic calculator, a word processor, a workstation, a videophone, a POS terminal, a digital still camera, and so forth.

Configuration of Liquid Crystal Device

Next, with reference to FIGS. 2 and 3, an explanation is given below of an example of the configuration of a liquid crystal device 100 that can be applied to various kinds of electronic apparatuses, an example of which is explained above.

Figure 2:
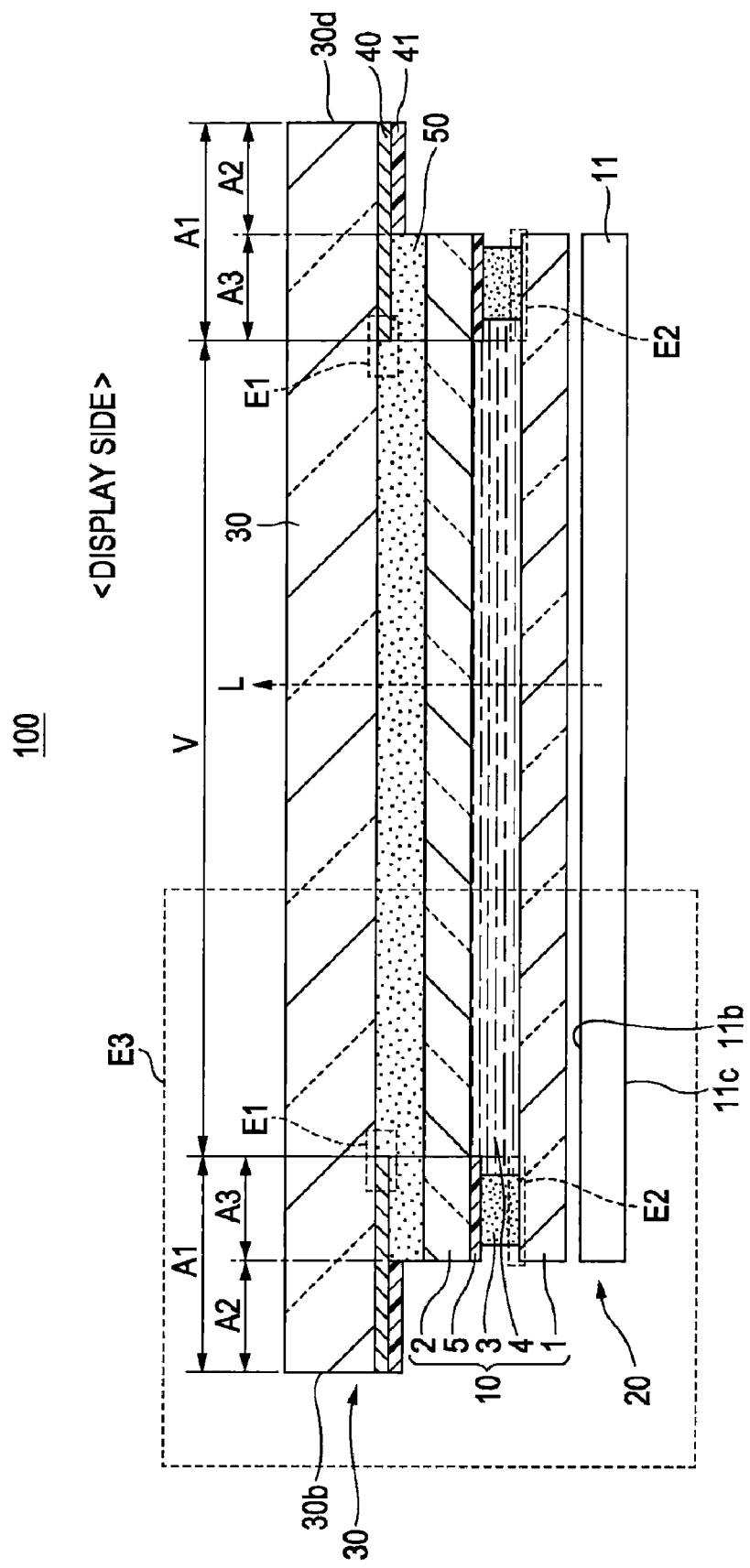
FIG. 2 is a sectional view taken along the line II-II of FIG. 1 so as to illustrate an example of the layer structure of a liquid crystal device according to a first embodiment of the invention.
Figure 3:
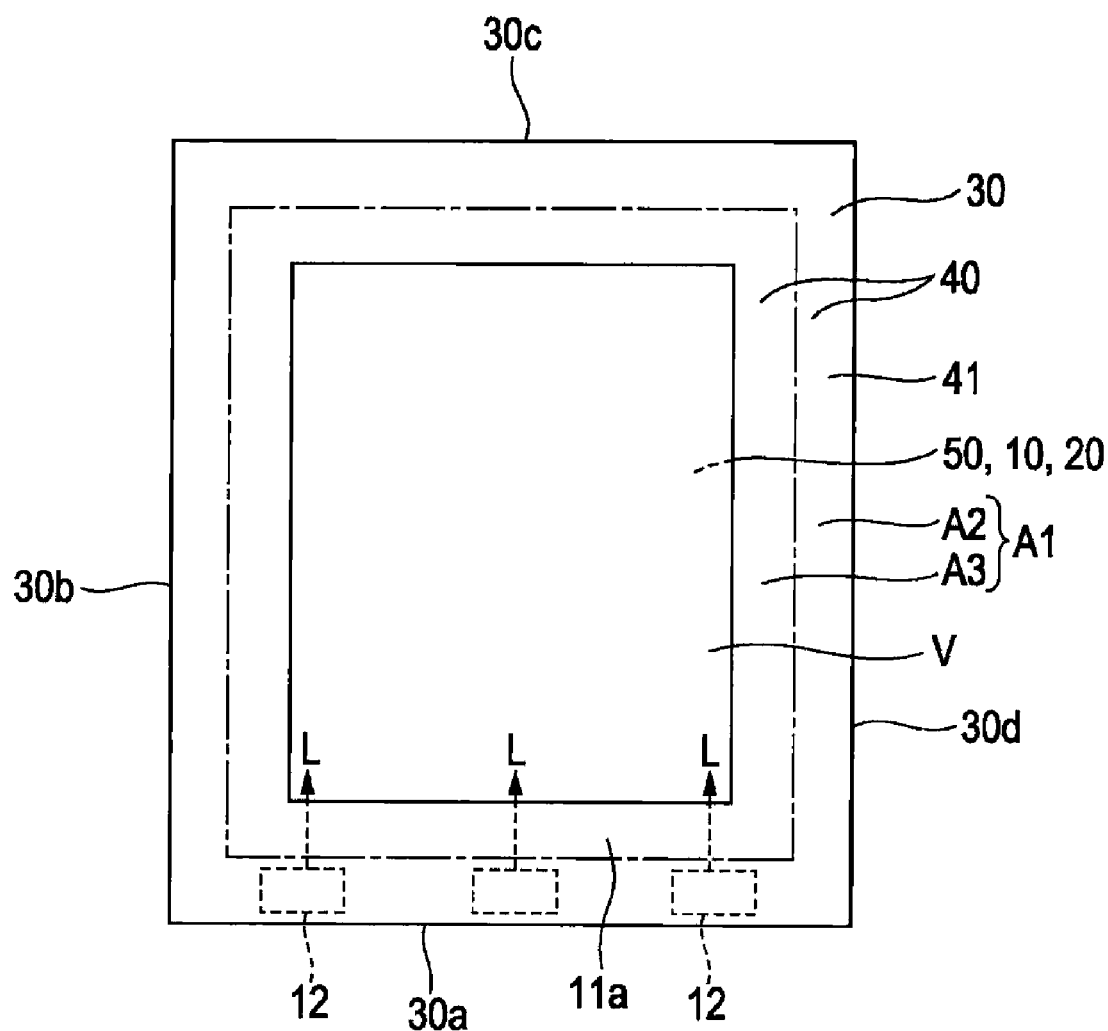
FIG. 3 is a plan view that schematically illustrates an example of the configuration of a liquid crystal device that is illustrated in FIG. 2; specifically.

FIG. 2 is a sectional view taken along the line II-II of FIG. 1 so as to illustrate an example of the layer structure of the liquid crystal device 100 according to a first embodiment of the invention. It should be noted that constituent elements that make up the mobile phone 800 other than the liquid crystal device 100 thereof are not shown in the sectional view of FIG. 2. FIG. 3 is a plan view that schematically illustrates an example of the configuration of the liquid crystal device 100 that is illustrated in FIGS. 1 and 2; specifically, FIG. 3 shows an example of the two-dimensional configuration of the liquid crystal device 100 viewed from a display side, which is a side at which images are displayed. A light-transmissive protection plate 30 illustrated in FIGS. 2 and 3 has four sides. A light source or a set of light sources 12 is provided at one of these four edges. In the planar configuration of the liquid crystal device 100 illustrated in FIG. 3, the light-source side is denoted as 30a, whereas remaining three sides are denoted as 30b, 30c, and 30d in the order of appearance herein as viewed from the light-source side 30a in a clockwise direction. The light-transmissive protection plate 30 that is described herein is a non-limiting example of a light-transmissive member according to an aspect of the invention.

The liquid crystal device 100 is provided with, as main components thereof, a liquid crystal display panel 10, an illumination device 20, the light-transmissive protection plate 30, a coloration layer 40, a light-shielding layer (a first light-shielding layer) 41, and an adhesive material 50. The liquid crystal display panel 10 that is described herein is a non-limiting example of an electro-optical panel according to an aspect of the invention.

The liquid crystal display panel 10 includes a first substrate substance 1, a second substrate substance 2, a sealant 3, and a liquid crystal layer 4. The first substrate substance 1 is made of a light-transmissive material such as glass. The second substrate substance 2 is also made of a transparent material such as glass. The sealing material 3 is provided in the shape of a frame between the first substrate substance 1 and the second substrate substance 2 that are pasted or bonded in any other way to each other. The liquid crystal layer 4 is made of liquid crystal sealed in a space that is demarcated by the frame-shaped sealant 3. The liquid crystal that is described herein is a non-limiting example of an electro-optical material according to an aspect of the invention. An effective image display area V, which is an area that contributes to image display, is formed inside the area surrounded by the frame-shaped sealing material 3. Another light-shielding layer (a second light-shielding layer) 5 is formed at a certain area on the liquid-crystal-side (4) surface of the second substrate substance 2. The liquid-crystal-side (4) surface of the second substrate substance 2 means one of two main surfaces of the second substrate substance 2 that faces the liquid crystal layer 4 and thus is closer to the liquid crystal layer 4 than the other opposite surface thereof. The second light-shielding layer 5 is made of a material that has light-shielding property such as a black resin or the like. A more detailed explanation of the second light-shielding layer 5 will be given later. In addition to the components explained above, other various constituent elements including but not limited to a black matrix, a color filter, and electrodes are formed on the liquid-crystal-side (4) surface of the substrate substance of the liquid crystal display panel 10 in a matrix layout such as a lattice array pattern or a stripe layout such as a line array pattern. Note that these other constituent elements are not illustrated in FIG. 2. The configuration of the liquid crystal display panel 10 is not restrictively specified in this specification. Accordingly, it is possible to adopt a variety of known configurations in the formation of the liquid crystal display panel 10. For example, the first substrate substance 1 may be formed as an array substrate on which a plurality of pixel electrodes, a plurality of switching elements each of which performs electric switching operation for the corresponding one of the plurality of pixel electrodes, and the like are provided, whereas the second substrate substance 2 may be formed as a color filter substrate on which a color filter and the like are provided. Or, the first substrate body 1 may be formed as a color filter substrate with the second substrate body 2 being formed as an array substrate.

The illumination device 20 is provided at a non-display side that is opposite to the display side of the liquid crystal display panel 10. The illumination device 20 is provided with at least one light source 12, which is, as illustrated in FIG. 3, the plurality of light sources in the configuration of the liquid crystal device 100 according to the present embodiment of the invention. In addition to the plurality of light sources 12, the illumination device 20 is provided with an optical waveguide board 11, which is a light-guiding plate, and various kinds of optical sheets that are not illustrated in the drawing. The optical waveguide board 11 guides and directs an incoming beam of light L that was emitted from the light sources 12 toward the liquid crystal display panel 10. The optical sheets are provided on a surface of the optical waveguide board 11 that faces the liquid crystal display panel 10.

An example of the light source 12 is a light emitting diode (LED). The light source 12 is provided at such a position that it faces the plane of incidence 11a of the optical waveguide board 11 as illustrated in FIG. 3. The incident plane 11a to which the light source 12 is directed is one of the side faces of the optical waveguide board 11. The optical waveguide board 11 is made of a light-transmissive material such as a transparent resin. The optical waveguide board 11 has a substantially plate-like shape. The optical waveguide board 11 is provided at a position opposite to the position of the liquid crystal display panel 10. In addition to the incident plane 11a through which a beam of light L that was emitted from the light source 12 enters, the optical waveguide board 11 has an emitting plane 11b, which constitutes the upper surface thereof, and a reflecting plane 11c, which constitutes the lower surface thereof. The beam of light L that entered through the incident plane 11a is emitted from the emitting plane 11b toward the liquid crystal display panel 10. The beam of light L that entered through the incident plane 11a and a beam of light L reflected at the emitting plane 11b and the like are reflected at the reflecting plane 11c toward the emitting plane 11b.

Examples of the various kinds of optical sheets are a prism sheet that gathers rays of light L coming from the optical waveguide board 11 so that the light L converges toward the liquid crystal display panel 10 and a light diffusion sheet that diffuses the light L coming from the optical waveguide board 11 toward the liquid crystal display panel 10, without any limitation thereto. In the configuration of a liquid crystal device according to an exemplary embodiment of the invention, these optical sheets may be combined with each other or one another for use. Or, at least one of these optical sheets may be used. Alternatively, no optical sheet may be provided over the illumination device 20.

The light-transmissive protection plate 30 such as a light-transmissive cover is made of a material that has light-transmitting property. Examples of the material of the light-transmissive protection plate 30 are an acrylic resin, a polycarbonate resin, a composition of an acrylic resin and a polycarbonate resin, or glass. Being provided at the image-display side of the liquid crystal display panel 10, the light-transmissive protection plate 30 has a function of protecting the liquid crystal display panel 10 against an external force such as a pressing force, a shock, and the like that is applied from the outside. In the configuration of the liquid crystal device 100 according to the present embodiment of the invention, the dimension of the light-transmissive protection plate 30 is larger than the dimension of each of the liquid crystal display panel 10 and the illumination device 20. Accordingly, a peripheral edge part of the light-transmissive protection plate 30 is positioned outside the edge of the liquid crystal display panel 10 as a protruding part. The light-transmissive protection plate 30 has a first area that corresponds to the effective image display area V of the liquid crystal display panel 10 and a second area outside the first area.

The coloration layer 40 is formed at the peripheral second area on the surface of the light-transmissive protection plate 30 that faces toward the liquid crystal display panel 10 in order to enhance the design quality of the light-transmissive protection plate 30 in such a manner that the area at which the coloration layer 40 is formed does not overlap the effective image display area V in a plan view. In the configuration of the liquid crystal device 100 according to the present embodiment of the invention, when viewed in plan, the coloration layer 40 has the shape of a frame in an area A1 shown in FIGS. 2 and 3. Notwithstanding the foregoing, however, the planar shape of the coloration layer 40 is not limited to such a specific example. The coloration layer 40 is formed on the light-transmissive protection plate 30 by means of a well-known method such as a screen-printing method, a vapor deposition method, a photolithography method, or the like. The coloration layer 40 is formed to be as thin as possible to the extent that color-rendering properties are not sacrificed. The coloration layer 40 has, for example, a single color pattern or a monochrome pattern. Or, the coloration layer 40 has a pattern that includes a plurality of colors. The pattern of the coloration layer 40 may be made up of characters, figures, symbols, and the like. Or, the coloration layer pattern may be any combination of the foregoing.

The first light-shielding layer 41 is made of a material that has light-shielding property such as a black resin or the like. The first light-shielding layer 41 has a function of preventing the optical leakage of a beam of light propagating from the liquid crystal display panel 10 or the illumination device 20. In addition, the first light-shielding layer 41 has another function of preventing the inner components of the liquid crystal device 100 from being seen through when the liquid crystal device 100 is viewed from the display side. The light-shielding layer 41 is formed on a surface of the coloration layer 40 that faces toward the liquid crystal display panel 10 at an area where the adhesive material 50, which will be explained in the next paragraph, is not provided. In the configuration of the liquid crystal device 100 according to the present embodiment of the invention, the light-shielding layer 41 has the shape of a frame in an area A2 shown in FIGS. 2 and 3 when viewed in plan. The area of the light-shielding layer 41 is smaller than that of the coloration layer 40. The light-shielding layer 41 is formed on the coloration layer 40 by means of the same method as, or a method similar to, the well-known method used for the formation of the coloration layer 40 on the light-transmissive protection plate 30. The coloration layer 40 and the light-shielding layer 41 overlap each other in a plan view at the area A2, whereas the light-shielding layer 41 is not formed at the area A3. Therefore, a dual-layer structure that is made up of the coloration layer 40 and the light-shielding layer 41 is formed at the area A2, whereas a single-layer structure that is made of the coloration layer 40 is formed at the area A3. In order to facilitate the understanding of the positional relationship between the dual-layer area A2 and the single-layer area A3, these areas are shown with hatching patterns different from each other in FIG. 3.

The adhesive material 50 is a member by means of which the liquid crystal display panel 10 and the light-transmissive protection plate 30 adhere to each other. The adhesive material 50 is provided as a gluing layer between the liquid crystal display panel 10 and the light-transmissive protection plate 30 partially at the area A3 where the coloration layer 40 does not overlap the light-shielding layer 41 and partially at the effective image display area V where the light-transmissive protection plate 30 does not overlap the coloration layer 40 so as to keep the liquid crystal display panel 10 and the light-transmissive protection plate 30 in tight adhesive contact with each other. That is, the adhesive material 50 is provided between a bonded part of the coloration layer 40 (area A3) and the corresponding part of the liquid crystal display panel 10 as well as between the first-area part of the light-transmissive protection plate 30 and the corresponding part of the liquid crystal display panel 10 so as to offer tight adhesive contact therebetween. Therefore, the adhesive material 50 is provided across a border between the area A3 where the coloration layer 40 does not overlap the light-shielding layer 41 and the area where the light-transmissive protection plate 30 does not overlap the coloration layer 40 (i.e., effective image display area V). The adhesive material 50 has optical transparency. In addition to the light-transmitting property, the adhesive material 50 has shock-absorbing property. Therefore, the adhesive material 50 can absorb a force that is applied from the outside (i.e., external force). Moreover, the adhesive material 50 is made of a substance that can be elastically deformed to some degree. A few examples of the material of the adhesive member 50 are an acrylic gluing agent, a silicon gluing agent, or an epoxy gluing agent.

The liquid crystal device 100 having the configuration explained above operates as follows. A beam of light L emitted from the light source 12 enters the optical waveguide board 11 through the plane of incidence 11a thereof. Then, the beam of light L that has entered the optical waveguide board 11 is reflected between the emitting plane 11b thereof and the reflecting plane 11c thereof repeatedly. When an angle that is formed by the propagating direction of the beam of reflected light L and the extending direction of a normal line to the emitting plane 11b becomes smaller than a critical angle, the beam of reflected light L is emitted from the emitting plane 11b of the optical waveguide board 11 toward the liquid crystal display panel 10. When the emitted light L passes through the liquid crystal display panel 10, it is subjected to optical modulation at the liquid crystal layer 4 in which the orientation, that is, alignment, of liquid crystal molecules is controlled. As a result, an observer visually perceives a desired display image.

Light Leakage Prevention Structure of Coloration Layer of Liquid Crystal Device

Next, with reference to FIGS. 2 and 3, a structure for preventing light leakage from occurring at the coloration layer 40 of the liquid crystal device 100 according to the first embodiment of the invention is explained below.

In the configuration of the liquid crystal device 100 according to the present embodiment of the invention, the light-shielding layer 41 is formed on the liquid-crystal-display-panel-side (10) surface of an un-bonded part of the coloration layer 40 at the area A2 where the adhesive material 50 is not provided. That is, the first light-shielding layer 41 is formed at the area A2 where the coloration layer 40 does not overlap the adhesive material 50 at all in a plan view. On the other hand, the second light-shielding layer 5 is formed at the area A3 on the liquid-crystal-side (4) surface of the second substrate substance 2 of the liquid crystal display panel 10. Accordingly, the second light-shielding layer 5 is formed so as to overlap a part of the coloration layer 40 that does not overlap the first light-shielding layer 41 at all or at least the part of the coloration layer 40 when viewed in plan. In other words, the first light-shielding layer 41 is formed over the liquid-crystal-display-panel-side (10) surface of the light-transmissive protection plate 30 at the area where the coloration layer 40 does not overlap the adhesive material 50 at all in a plan view, whereas the second light-shielding layer 5 is formed on the liquid-crystal-side (4) surface of the second substrate substance 2 of the liquid crystal display panel 10 at the area of the part of the coloration layer 40 that does not overlap the first light-shielding layer 41 at all in such a manner that the second light-shielding layer 5 overlaps the part of the coloration layer 40 when viewed in plan. In the configuration of the liquid crystal device 100 according to the present embodiment of the invention, the size of the area A1 of the coloration layer 40 is equal to a combined light-shielding area size that is obtained as a result of the addition of the area A2 of the first light-shielding layer 41 and the area A3 of the second light-shielding layer 5. Accordingly, the coloration layer 40 is formed at the same area as the combined light-shielding area of the first light-shielding layer 41 and the second light-shielding layer 5 so that they overlap completely when viewed in plan.

With the configuration of the liquid crystal device 100 explained above, even when a beam of leakage light L that comes from the illumination device 20 propagates toward the coloration layer 40 during the operation of the liquid crystal device 100, the first light-shielding layer 41 and the second light-shielding layer 5 that are formed to completely overlap the coloration layer 40 shut off the leaked beam of light L so as to offer "perfect shielding". Herein, the term "perfect shielding" means a shielded state in which the inner components and the like of the liquid crystal display panel 10 are not seen through when observed from the peripheral edge part of the light-transmissive protection plate 30. The shielded state that is meant by this term includes a state in which some light might leak toward the display side to the extent that, even in such a case, the leakage does not affect visual perception performance. With such perfect shielding, it is possible to prevent a beam of light from leaking toward the display side at the area corresponding to the coloration layer 40. Therefore, it is possible to avoid the deterioration of the color-rendering properties of the coloration layer 40. Consequently, the design quality of the light-transmissive protection plate 30 is enhanced by means of the coloration layer 40. It should be particularly noted that the first light-shielding layer 41 and the second light-shielding layer 5 are not limited to one that shuts light off perfectly. That is, a light-shielding layer that shuts light off but allows a small amount of light to be transmitted may be used as the first light-shielding layer 41 and/or the second light-shielding layer 5. Even in such a case, the disclosed configuration contributes to the improvement in design quality.

In the illustrated configuration of the liquid crystal device 100 according to the first embodiment of the invention explained above, the first light-shielding layer 41 and the second light-shielding layer 5 do not overlap each other at all when viewed in plan. However, there is an adverse possibility that a slight positional shift such as a positional deviation or a positional error in the relative positions of the first light-shielding layer 41 and the second light-shielding layer 5 occurs during the process of manufacturing the liquid crystal device 100 due to precision in the mechanical position determination of a manufacturing apparatus that is used for manufacturing the liquid crystal device 100. If such a positional error occurs in the relative positions of the first light-shielding layer 41 and the second light-shielding layer 5, a gap area at which the coloration layer 40 only is provided may be formed between the area of the first light-shielding layer 41 and the area of the second light-shielding layer 5. In such a case, a beam of leakage light L that comes from the illumination device 20 passes through the gap area at which the coloration layer 40 only is formed between the area of the first light-shielding layer 41 and the area of the second light-shielding layer 5. As a result, the leaked beam of light L deteriorates the color-rendering properties of the coloration layer 40. In order to avoid such undesirable leakage of light from occurring, it is preferable that the first light-shielding layer 41 and the second light-shielding layer 5 should be formed in such a layout that they partially overlap each other when viewed in plan.

Figure 4:
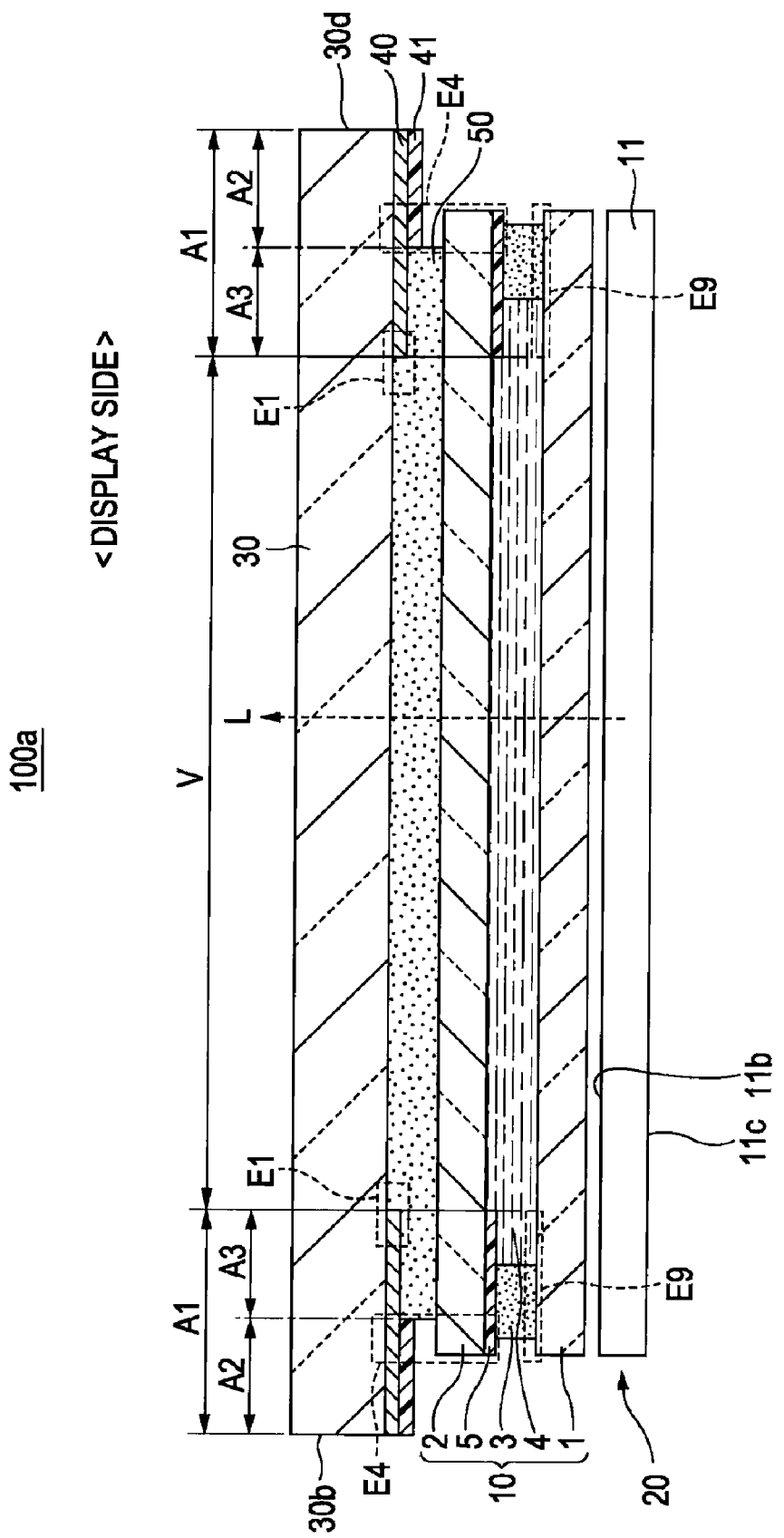
FIG. 4 is a sectional view that schematically illustrates an example of the layer structure of a liquid crystal device according to a modification example of the first embodiment of the invention corresponding to FIG. 2.

In connection therewith, an example of a partial overlap structure is explained below while referring to FIG. 4. FIG. 4 is a sectional view that schematically illustrates an example of the layer structure of a liquid crystal device 100a, which is a modification example of the liquid crystal device 100 according to the first embodiment of the invention explained above while referring to FIG. 2.

The liquid crystal device 100a according to a modification example of the first embodiment of the invention differs from the liquid crystal device 100 according to the first embodiment of the invention in the relative dimensions of the liquid crystal display panel 10 and the light-transmissive protection plate 30. In the configuration of the liquid crystal device 100a according to a modification example of the first embodiment of the invention, a peripheral edge part of the liquid crystal display panel 10 partially overlaps the first light-shielding layer 41 that is formed indirectly on the surface of the light-transmissive protection plate 30 when viewed in plan. In addition, the second light-shielding layer 5 is formed on the liquid-crystal-side (4) surface of the second substrate substance 2 across a border between the area A3 where the coloration layer 40 does not overlap the first light-shielding layer 41 and a part of the area A2 where the coloration layer 40 and the first light-shielding layer 41 overlap each other in a plan view. At a dotted-line area E4 shown in FIG. 4, the first light-shielding layer 41 and the second light-shielding layer 5 partially overlap each other when viewed in plan.

With such a modified structure, even in a case where a small positional error in the relative positions of the first light-shielding layer 41 and the second light-shielding layer 5 occurs during the process of manufacturing the liquid crystal device 100a due to the mechanical position determination performance of a manufacturing apparatus that is used for manufacturing the liquid crystal device 100a, it is possible to avoid such a positional deviation in the relative positions of the first light-shielding layer 41 and the second light-shielding layer 5 from forming a gap area at which the coloration layer 40 only is provided between the area of the first light-shielding layer 41 and the area of the second light-shielding layer 5. Therefore, with the configuration of the liquid crystal device 100a explained above, even when a beam of leakage light L that comes from the illumination device 20 propagates toward the coloration layer 40, the first light-shielding layer 41 and the second light-shielding layer 5 that are formed to overlap the coloration layer 40 and formed to partially overlap each other shut off the leaked beam of light L so as to offer the perfect shielding defined above. With such perfect shielding, it is possible to prevent a beam of light from leaking toward the display side at the area corresponding to the coloration layer 40, which is the same non-limiting advantage as that offered by the liquid crystal device 100 according to the first embodiment of the invention. Thus, it is possible to avoid the deterioration of the color-rendering properties of the coloration layer 40.

In the foregoing description of the configuration of the liquid crystal device 100 according to the first embodiment of the invention, it is explained that the second light-shielding layer 5 is formed at the area A3 on the liquid-crystal-side (4) surface of the second substrate substance 2 so as to overlap a part of the coloration layer 40 that does not overlap the first light-shielding layer 41 at all when viewed in plan. In addition, in the foregoing description of the configuration of the liquid crystal device 100a according to a modification example of the first embodiment of the invention, it is explained that, the second light-shielding layer 5 is formed on the liquid-crystal-side (4) surface of the second substrate substance 2 across a border between the area A3 where the coloration layer 40 does not overlap the first light-shielding layer 41 and a part of the area A2 where the coloration layer 40 and the first light-shielding layer 41 overlap each other in a plan view.

However, the scope of this aspect of the invention is not limited to such an exemplary structure. For example, the second light-shielding layer 5 may be formed at the area A3 not on the liquid-crystal-side (4) surface of the second substrate substance 2 but on the liquid-crystal-side (4) surface of the first substrate substance 1 as indicated as a dotted-line area E2 in FIG. 2 so as to overlap a part of the coloration layer 40 that does not overlap the first light-shielding layer 41 at all when viewed in plan. Or, the second light-shielding layer 5 may be formed not on the liquid-crystal-side (4) surface of the second substrate substance 2 but on the liquid-crystal-side (4) surface of the first substrate substance 1 as indicated as a dotted-line area E9 in FIG. 4 across a border between the area A3 where the coloration layer 40 does not overlap the first light-shielding layer 41 and a part of the area A2 where the coloration layer 40 and the first light-shielding layer 41 overlap each other in a plan view.

Note that it is not always necessary to provide the second light-shielding layer 5 in the configuration of the liquid crystal device 100. For example, the first light-shielding layer 41 may be formed on the liquid-crystal-display-panel-side (10) surface of the coloration layer 40 at the area A2 where the adhesive material 50 is not provided without forming the second light-shielding layer 5.

Structure for Preventing Degradation in Display Quality of Liquid Crystal Device Next, with reference to FIGS. 2 and 3, a structure for preventing degradation in display quality of the liquid crystal device 100 according to the first embodiment of the invention is explained below.

As explained earlier, in the configuration of the liquid crystal device 100 according to the first embodiment of the invention, the adhesive material 50 is provided as an adhesive layer between the liquid crystal display panel 10 and the light-transmissive protection plate 30 partially at the area A3 where the coloration layer 40 does not overlap the first light-shielding layer 41 and partially at the effective image display area V where the light-transmissive protection plate 30 does not overlap the coloration layer 40 so as to keep the liquid crystal display panel 10 and the light-transmissive protection plate 30 in tight adhesive contact with each other. That is, the adhesive material 50 is provided between a part of the coloration layer 40 (area A3) and the corresponding part of the liquid crystal display panel 10 as well as between the first-area part of the light-transmissive protection plate 30 and the corresponding part of the liquid crystal display panel 10 so as to offer tight adhesive contact therebetween. In addition, the coloration layer 40, which is formed on a surface of the light-transmissive protection plate 30, has a single-layer structure or the like at the area A3. The coloration layer 40 is formed as a film layer that is thin enough so as not to impair color-rendering properties. Therefore, a difference in level between the surface of the coloration layer 40 at the area A3 and the surface of the light-transmissive protection plate 30 at the area where the coloration layer 40 is not formed, that is, at the effective image display area V, is small. The difference is hereafter referred to as "level difference E1" and indicated with a dotted box E1 in the accompanying drawings. In contrast, if the adhesive material 50 is provided so as to cover an area range from the area A2 inclusive where the coloration layer 40 and the light-shielding layer 41 overlap each other so as to constitute a dual-layer structure to the area where the coloration layer 40 is not formed (i.e., the effective image display area V) over/on the light-transmissive protection plate 30, the level difference therebetween is relatively large. In addition, as explained earlier, the adhesive material 50 is made of a substance that can be elastically deformed to some degree.

Because of the structure explained above, it is substantially less likely that air bubbles are produced at the level difference E1 when the liquid crystal display panel 10 and the light-transmissive protection plate 30 are bonded to each other with the use of the adhesive material 50. Regardless of whether the light-transmissive protection plate 30 is bonded to the adhesive material 50 that has been pre-bonded to the second substrate substance 2 or the adhesive material 50 is bonded to the light-transmissive protection plate 30 before it is bonded to the second substrate substance 2, it is substantially less likely that air bubbles are produced at the level difference E1. Therefore, it is possible to avoid poor display quality due to a difference in the index of refraction of any air bubble and the index of refraction of the light-transmissive protection plate 30 and the like.

Moreover, since the level difference E1 is small as explained above, a distance between the liquid crystal display panel 10 and the light-transmissive protection plate 30 is not large. Therefore, there is no risk at all or almost no risk that a stress is applied to the liquid crystal display panel 10 in a direction of pulling the liquid crystal display panel 10 toward the light-transmissive protection plate 30 due to the adhesion force of the adhesive material 50 when the liquid crystal display panel 10 and the light-transmissive protection plate 30 are bonded to each other with the use of the adhesive material 50. That is, regardless of whether the light-transmissive protection plate 30 is bonded, at the predetermined area explained above, to the adhesive material 50 that has been bonded to the bonding surface of the second substrate substance 2 in advance or the adhesive material 50 is bonded to the predetermined area of the light-transmissive protection plate 30 before it is bonded to the second substrate substance 2, no stress is applied to the liquid crystal display panel 10 in a direction of pulling the liquid crystal display panel 10 toward the light-transmissive protection plate 30 due to the adhesion force of the adhesive material 50. In addition, no stress that causes the liquid crystal display panel 10 to be deflected under the pulling force is applied to the liquid crystal display panel 10. For this reason, it is possible to avoid the occurrence of display unevenness or other image problems due to the deflection of the liquid crystal display panel 10. Thus, it is further possible to prevent the quality of display images from being adversely affected thereby.

If the coloration layer 40 is formed at the area A1 that is outside the effective image display area V on the other surface of the light-transmissive protection plate 30 that is opposite to the liquid-crystal-display-panel-side (10) surface thereof, the coloration layer 40 and the first light-shielding layer 41 do not exist between the adhesive material 50 and the light-transmissive protection plate 30. In other words, there is not any level difference between the adhesive material 50 and the light-transmissive protection plate 30 because the coloration layer 40 and the first light-shielding layer 41 do not exist between the adhesive material 50 and the light-transmissive protection plate 30 in such a modified layer structure. Therefore, when the liquid crystal display panel 10 and the light-transmissive protection plate 30 are bonded to each other by means of the adhesive material 50, or when the liquid crystal display panel 10*a* and the light-transmissive protection plate 30 are bonded to each other by means of the adhesive material 50, it is substantially less likely that air bubbles are produced between the light-transmissive protection plate 30 and the adhesive material 50. For this reason, it is possible to avoid poor display quality due to a difference in the index of refraction of any air bubble and the index of refraction of the light-transmissive protection plate 30 and the like.

Second Embodiment

Figure 5:
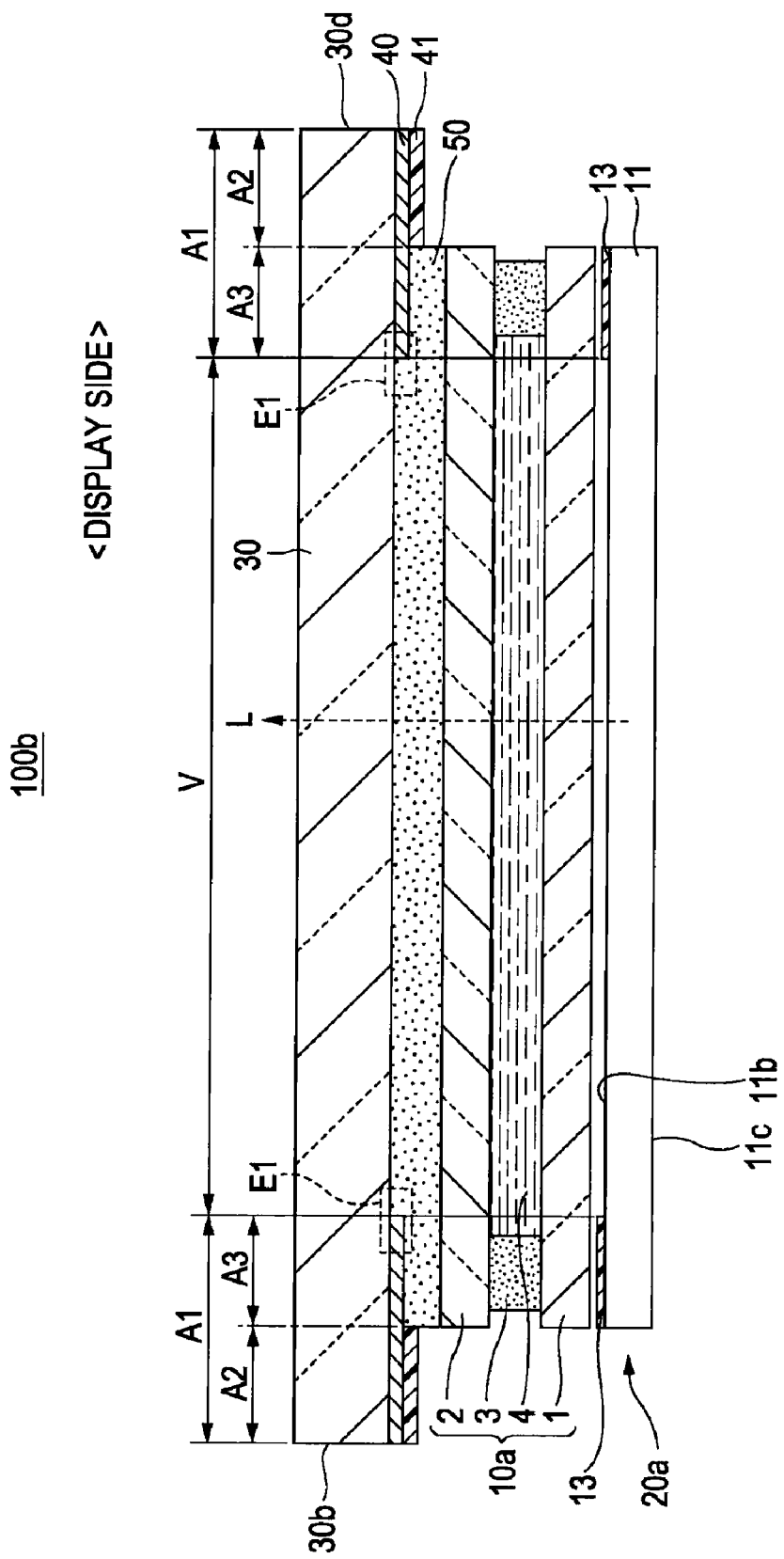
FIG. 5 is a sectional view that schematically illustrates an example of the layer structure of a liquid crystal device according to a second embodiment of the invention corresponding to FIG. 2.

Next, with reference to FIG. 5, an explanation is given below of an exemplary configuration and other features of a liquid crystal device 100*b* according to a second embodiment of the invention. FIG. 5 is a sectional view that schematically illustrates an example of the layer structure of the liquid crystal device 100*b* according to the second embodiment of the invention, which is taken along a section line corresponding to that of the liquid crystal device 100 explained earlier while referring to FIG. 2.

The configuration of the liquid crystal device 100*b* according to the second embodiment of the invention differs from that of the liquid crystal device 100 according to the first embodiment of the invention in terms of the structures of its liquid crystal display panel and illumination device. Except for these differences, the structure of the liquid crystal device 100*b* according to the second embodiment of the invention is the same as that of the liquid crystal device 100 according to the first embodiment of the invention. Therefore, in the following description of the liquid crystal device 100*b* according to the second embodiment of the invention, the same reference numerals are consistently used for the same components as those of the liquid crystal device 100 according to the first embodiment of the invention so as to omit, if appropriate, any redundant explanation or simplify explanation thereof.

The configuration of a liquid crystal display panel 10*a* according to the second embodiment of the invention differs from that of the liquid crystal display panel 10 according to the first embodiment of the invention in that the liquid crystal display panel 10*a* according to the second embodiment of the invention is not provided with the light-shielding layer (the second light-shielding layer) 5. Except for such a difference, the configuration of the liquid crystal display panel 10*a* according to the second embodiment of the invention is the same as that of the liquid crystal display panel 10 according to the first embodiment of the invention. The configuration of an illumination device 20a according to the second embodiment of the invention differs from that of the illumination device 20 according to the first embodiment of the invention in that, in the former configuration, a light-shielding layer (a third light-shielding layer) 13 is formed at the area A3 on a surface of the optical waveguide board 11 that faces the liquid crystal display panel 10a so as to overlap a part of the coloration layer 40 that does not overlap the first light-shielding layer 41 at all when viewed in plan. Except for such a difference, the configuration of the illumination device 20a according to the second embodiment of the invention is the same as that of the illumination device 20 according to the first embodiment of the invention.

Light Leakage Prevention Structure of Liquid Crystal Device

Next, with reference to FIG. 5, a structure for preventing light leakage from occurring at the coloration layer 40 of the liquid crystal device 100b according to the second embodiment of the invention is explained below.

In the configuration of the liquid crystal device 100b according to the present embodiment of the invention, the light-shielding layer 41 is formed on a surface of the coloration layer 40 that faces toward the liquid crystal display panel 10a at the area A2 where the adhesive material 50 is not provided. That is, the first light-shielding layer 41 is formed at the area A2 where the coloration layer 40 does not overlap the adhesive material 50 at all in a plan view. On the other hand, the third light-shielding layer 13 is formed at the area A3 on the emitting plane 11b of the optical waveguide board 11 of the illumination device 20a, which constitutes the liquid-crystal-display-panel-side (10a) surface. Accordingly, the third light-shielding layer 13 is formed so as to overlap a part of the coloration layer 40 that does not overlap the first light-shielding layer 41 at all or at least the part of the coloration layer 40 when viewed in plan. In other words, the first light-shielding layer 41 is formed over the liquid-crystal-display-panel-side (10a) surface of the light-transmissive protection plate 30 at the area where the coloration layer 40 does not overlap the adhesive material 50 at all in a plan view, whereas the third light-shielding layer 13 is formed on the emitting plane 11b of the optical waveguide board 11 of the illumination device 20a at the area of the part of the coloration layer 40 that does not overlap the first light-shielding layer 41 at all in such a manner that the third light-shielding layer 13 overlaps the part of the coloration layer 40 when viewed in plan. In the configuration of the liquid crystal device 100b according to the present embodiment of the invention, the size of the area A1 of the coloration layer 40 is equal to a combined light-shielding area size that is obtained as a result of the addition of the area A2 of the first light-shielding layer 41 and the area A3 of the third light-shielding layer 13. Accordingly, the coloration layer 40 is formed at the same area as the combined light-shielding area of the first light-shielding layer 41 and the third light-shielding layer 13 so that they overlap completely when viewed in plan.

With the configuration of the liquid crystal device 100b explained above, when a beam of light L that was emitted from the light source 12 enters the optical waveguide board 11 through the plane of incidence 11a thereof, the first light-shielding layer 41 and the third light-shielding layer 13 shut off the emitted light L during the operation of the liquid crystal device 100b. Since the first light-shielding layer 41 and the third light-shielding layer 13 shut off the emitted light L, the light L is not transmitted through the coloration layer 40. For this reason, it is possible to prevent a beam of light from leaking toward the display side at the area corresponding to the coloration layer 40. Therefore, it is possible to avoid the deterioration of the color-rendering properties of the coloration layer 40. Consequently, the design quality of the light-transmissive protection plate 30 is enhanced by means of the coloration layer 40.

In the illustrated configuration of the liquid crystal device 100b according to the second embodiment of the invention explained above, the first light-shielding layer 41 and the third light-shielding layer 13 do not overlap each other at all when viewed in plan. However, there is an adverse possibility that a very small positional deviation in the relative positions of the first light-shielding layer 41 and the third light-shielding layer 13 occurs during the process of manufacturing the liquid crystal device 100b due to precision in the mechanical position determination of a manufacturing apparatus that is used for manufacturing the liquid crystal device 100b. If such a positional shift occurs in the relative positions of the first light-shielding layer 41 and the third light-shielding layer 13, a gap area at which the coloration layer 40 only is provided may be formed between the area of the first light-shielding layer 41 and the area of the third light-shielding layer 13. In such a case, a beam of leakage light L that comes from the illumination device 20a passes through the gap area at which the coloration layer 40 only is formed between the area of the first light-shielding layer 41 and the area of the third light-shielding layer 13. As a result, the leaked beam of light L deteriorates the color-rendering properties of the coloration layer 40. In order to avoid such undesirable leakage of light from occurring, it is preferable that the first light-shielding layer 41 and the third light-shielding layer 13 should be formed in such a layout that they partially overlap each other when viewed in plan.

Figure 6:
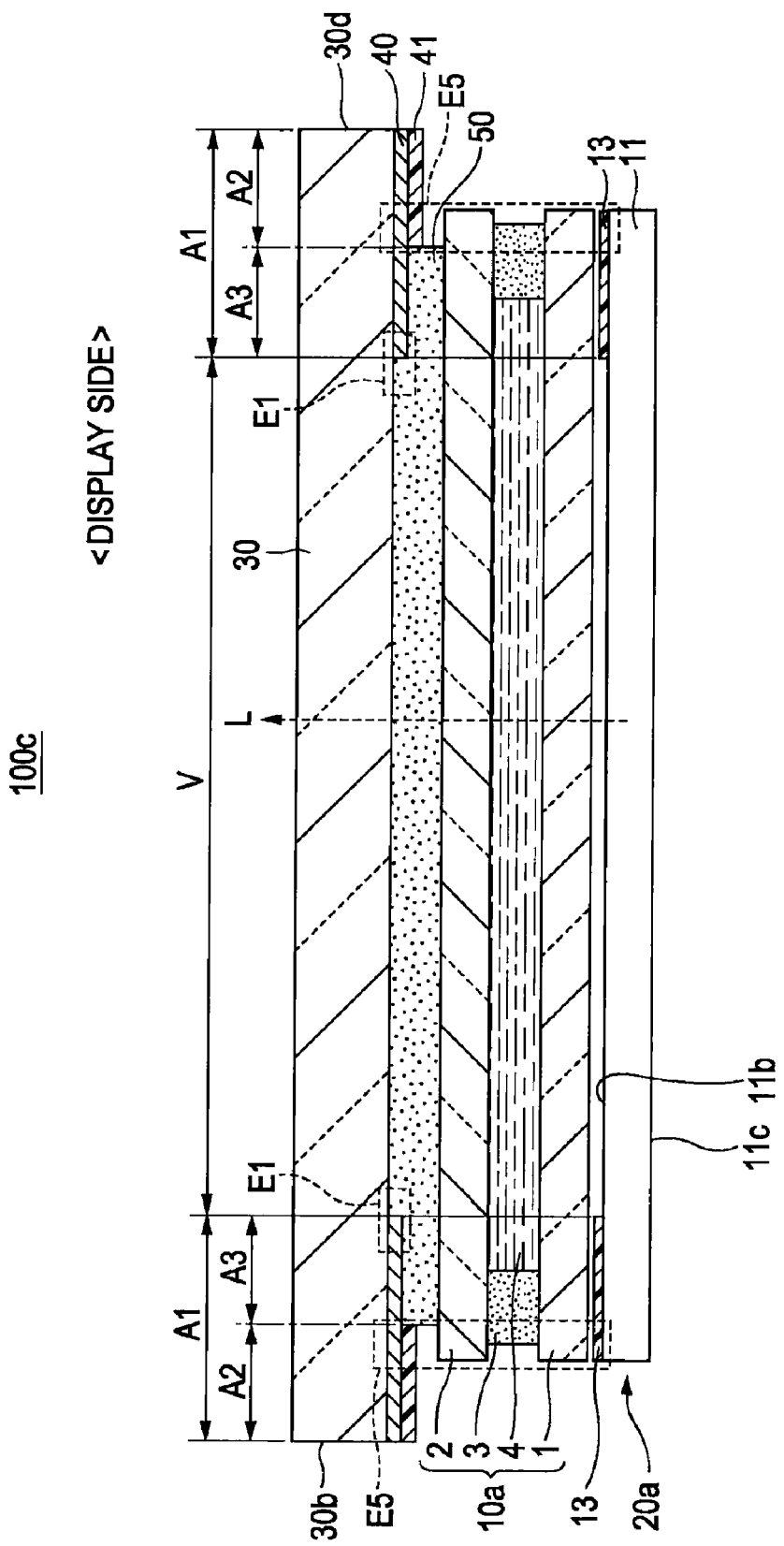
FIG. 6 is a sectional view that schematically illustrates an example of the layer structure of a liquid crystal device according to a modification example of the second embodiment of the invention corresponding to FIG. 2.

In connection therewith, an example of a partial overlap structure is explained below while referring to FIG. 6. FIG. 6 is a sectional view that schematically illustrates an example of the layer structure of a liquid crystal device 100c, which is a modification example of the liquid crystal device 100b according to the second embodiment of the invention, where the sectional view is taken along a section line corresponding to that of the liquid crystal device 100 explained earlier while referring to FIG. 2.

The liquid crystal device 100c according to a modification example of the second embodiment of the invention differs from the liquid crystal device 100b according to the second embodiment of the invention in the relative dimensions of the liquid crystal display panel 10a, the illumination device 20a, and the light-transmissive protection plate 30. In the configuration of the liquid crystal device 100c according to a modification example of the second embodiment of the invention, a peripheral edge part of the liquid crystal display panel 10a partially overlaps the first light-shielding layer 41 that is formed indirectly on the surface of the light-transmissive protection plate 30 when viewed in plan. In addition, a peripheral edge part of the illumination device 20a also partially overlaps the first light-shielding layer 41 that is formed indirectly on the surface of the light-transmissive protection plate 30 when viewed in plan. On the other hand, the third light-shielding layer 13 is formed on the emitting plane 11b of the optical waveguide board 11 of the illumination device 20a across a border between the area A3 where the coloration layer 40 does not overlap the first light-shielding layer 41 and a part of the area A2 where the coloration layer 40 and the first light-shielding layer 41 overlap each other in a plan view. At a dotted-line area E5 shown in FIG. 6, the first light-shielding layer 41 and the third light-shielding layer 13 partially overlap each other when viewed in plan.

With such a modified structure, even in a case where a small positional error in the relative positions of the first light-shielding layer 41 and the third light-shielding layer 13 occurs during the process of manufacturing the liquid crystal device 100c due to the mechanical position determination performance of a manufacturing apparatus that is used for manufacturing the liquid crystal device 100c, it is possible to avoid such a positional deviation in the relative positions of the first light-shielding layer 41 and the third light-shielding layer 13 from forming a gap area at which the coloration layer 40 only is provided between the area of the first light-shielding layer 41 and the area of the third light-shielding layer 13. Therefore, when a beam of light L that was emitted from the light source 12 enters the optical waveguide board 11 through the plane of incidence 11a thereof, the first light-shielding layer 41 and the third light-shielding layer 13 shut off the emitted light L. Since the first light-shielding layer 41 and the third light-shielding layer 13 shut off the emitted light L, the light L is not transmitted through the coloration layer 40. Therefore, it is possible to prevent a beam of light from leaking toward the display side at the area corresponding to the coloration layer 40, which makes it further possible to avoid the deterioration of the color-rendering properties of the coloration layer 40. Consequently, the design quality of the light-transmissive protection plate 30 is enhanced by means of the coloration layer 40.

In the configuration of the liquid crystal device 100b according to the second embodiment of the invention and/or in the configuration of the liquid crystal device 100c according to a modification example of the second embodiment of the invention, the first substrate substance 1 may have a protruding area part, which is formed relatively outside when viewed from the edge of the second substrate substance 2. Components such as a driver IC, which drives the liquid crystal layer 4, can be mounted on the protruding area part of the first substrate substance 1. In such a configuration, it is preferable that the third light-shielding layer 13 should be formed on the emitting plane 11b of the optical waveguide board 11 at a position that overlaps a border region between the first substrate substance 1 and the second substrate substance 2 in a plan view.

Structure for Preventing Degradation in Display Quality of Liquid Crystal Device A structure for preventing degradation in display quality of the liquid crystal device 100b according to the second embodiment of the invention is the same as that of the liquid crystal device 100 according to the first embodiment of the invention explained earlier. A structure for preventing degradation in display quality of the liquid crystal device 100c according to a modification example of the second embodiment of the invention is the same as that of the liquid crystal device 100a according to a modification example of the first embodiment of the invention explained earlier. Therefore, a detailed explanation thereof is omitted here.

Third Embodiment

Figure 7:
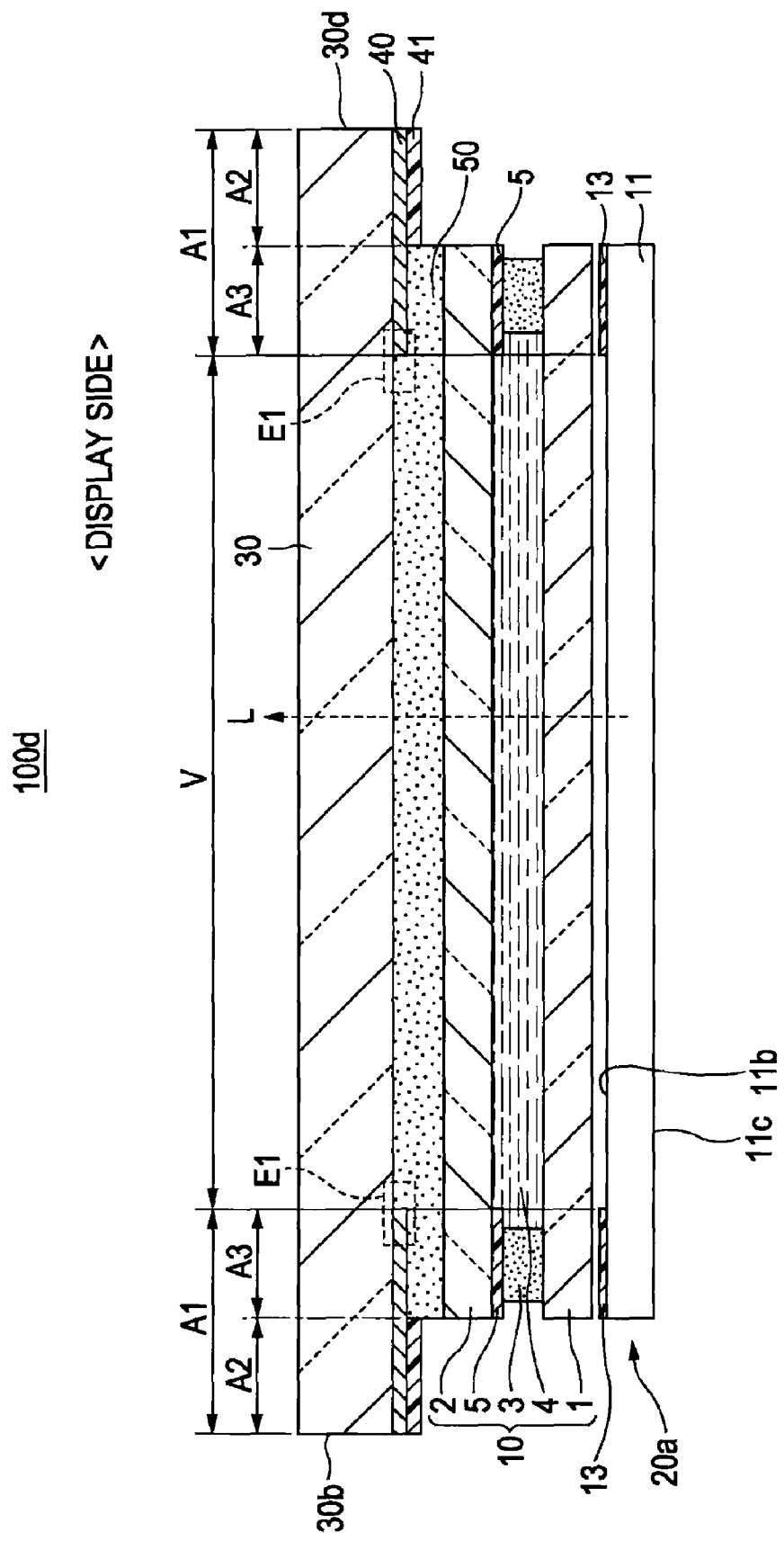
FIG. 7 is a sectional view that schematically illustrates an example of the layer structure of a liquid crystal device according to a third embodiment of the invention corresponding to FIG. 2.

Next, with reference to FIG. 7, an explanation is given below of an exemplary configuration and other features of a liquid crystal device 100d according to a third embodiment of the invention. Therefore, in the following description of the liquid crystal device 100d according to the third embodiment of the invention, the same reference numerals are consistently used for the same components as those of the liquid crystal device 100 according to the first embodiment of the invention and the liquid crystal device 100b according to the second embodiment of the invention so as to omit, if appropriate, any redundant explanation or simplify explanation thereof. FIG. 7 is a sectional view that schematically illustrates an example of the layer structure of the liquid crystal device 100d according to the third embodiment of the invention, which is taken along a section line corresponding to that of the liquid crystal device 100 explained earlier while referring to FIG. 2.

In the configuration of the liquid crystal device 100d according to the third embodiment of the invention, as in the configuration of the liquid crystal device 100b according to the second embodiment of the invention, the third light-shielding layer 13 is formed at the area A3 on the emitting plane 11b of the optical waveguide board 11 of the illumination device 20a. Accordingly, the third light-shielding layer 13 is formed so as to overlap a part of the coloration layer 40 that does not overlap the first light-shielding layer 41 at all when viewed in plan. In addition, as in the configuration of the liquid crystal device 100 according to the first embodiment of the invention, the second light-shielding layer 5 is formed at the area A3 on the liquid-crystal-side (4) surface of the second substrate substance 2 of the liquid crystal display panel 10. Accordingly, the second light-shielding layer 5 is formed so as to overlap the part of the coloration layer 40 that does not overlap the first light-shielding layer 41 at all when viewed in plan. That is, the second light-shielding layer 5 is formed in the liquid crystal display panel 10 at the area of the part of the coloration layer 40 that does not overlap the first light-shielding layer 41 at all in such a manner that the second light-shielding layer 5 overlaps the part of the coloration layer 40 when viewed in plan. In the configuration of the liquid crystal device 100d according to the present embodiment of the invention, the size of the area A1 of the coloration layer 40 is equal to a combined light-shielding area size that is obtained as a result of the addition of the area A2 of the first light-shielding layer 41 and the area A3 of the second light-shielding layer 5. That is, the size of the area A1 of the coloration layer 40 is equal to a combined light-shielding area size that is obtained as a result of the addition of the area A2 of the first light-shielding layer 41 and the area A3 of the third light-shielding layer 13. Accordingly, the coloration layer 40 is formed at the same area as the combined light-shielding area of the first light-shielding layer 41 and the second light-shielding layer 5, which is equal to the combined light-shielding area of the first light-shielding layer 41 and the third light-shielding layer 13. Thus, the combination of the first light-shielding layer 41 formed at the area A2 and the second light-shielding layer 5 formed at the area A3 overlap completely with the coloration layer 40 formed at the area A1 when viewed in plan; and in addition thereto, the combination of the first light-shielding layer 41 formed at the area A2 and the third light-shielding layer 13 formed at the area A3 overlap completely with the coloration layer 40 formed at the area A1 when viewed in plan.

Light Leakage Prevention Structure of Liquid Crystal Device

With the configuration of the liquid crystal device 100d explained above, when a beam of light L that was emitted from the light source 12 enters the optical waveguide board 11 through the plane of incidence 11a thereof, the first light-shielding layer 41, the second light-shielding layer 5, and the third light-shielding layer 13 shut off the emitted light L during the operation of the liquid crystal device 100d. Since the first light-shielding layer 41, the second light-shielding layer 5, and the third light-shielding layer 13 shut off the emitted light L, the light L is not transmitted through the coloration layer 40. Therefore, it is possible to prevent a beam of light from leaking toward the display side at the area corresponding to the coloration layer 40 with greater light-shielding effects, which makes it further possible to avoid the deterioration of the color-rendering properties of the coloration layer 40 with greater reliability. Consequently, the design quality of the light-transmissive protection plate 30 further improves by means of the coloration layer 40.

It is explained that the first light-shielding layer 41 and the second light-shielding layer 5 do not overlap each other at all when viewed in plan in the layout of the liquid crystal device 100d. In addition, it is explained that the first light-shielding layer 41 and the third light-shielding layer 13 do not overlap each other at all when viewed in plan in the layout of the liquid crystal device 100d. Notwithstanding the above, however, as explained earlier as the configuration of the liquid crystal device 100a according to a modification example of the first embodiment of the invention, the first light-shielding layer 41 and the second light-shielding layer 5 may partially overlap each other when viewed in plan. In like manner, as explained earlier as the configuration of the liquid crystal device 100c according to a modification example of the second embodiment of the invention, the first light-shielding layer 41 and the third light-shielding layer 13 may partially overlap each other when viewed in plan. In the foregoing description of the configuration of the liquid crystal device 100d according to the third embodiment of the invention, it is explained that the second light-shielding layer 5 is formed at the area A3 on the liquid-crystal-side (4) surface of the second substrate substance 2 of the liquid crystal display panel 10 corresponding to the A3-area part of the coloration layer 40, which does not overlap the first light-shielding layer 41 at all when viewed in plan. However, the scope of this aspect of the invention is not limited to such an exemplary structure. For example, the second light-shielding layer 5 may be formed at the area A3 on the liquid-crystal-side (4) surface of the first substrate substance 1 of the liquid crystal display panel 10 corresponding to the A3-area part of the coloration layer 40, which does not overlap the first light-shielding layer 41 at all when viewed in plan.

Structure for Preventing Degradation in Display Quality of Liquid Crystal Device A structure for preventing degradation in display quality of the liquid crystal device 100d according to the third embodiment of the invention is the same as that of the liquid crystal device 100 according to the first embodiment of the invention explained earlier. A structure for preventing degradation in display quality of a liquid crystal device according to the above-explained modification example of the third embodiment of the invention is the same as that of the liquid crystal device 100a according to a modification example of the first embodiment of the invention explained earlier. Therefore, a detailed explanation thereof is omitted here.

OTHER MODIFICATION EXAMPLES

Next, with reference to FIG. 8A, another modification example of an exemplary embodiment of the invention is explained below. FIG. 8A is an enlarged sectional view that schematically illustrates an example of the essential components of a liquid crystal device 100e according to another modification example of an exemplary embodiment of the invention; specifically, FIG. 8A shows a partial section that corresponds to a section area E3 shown by a dotted line in FIG. 2. FIG. 8A further illustrates a partial section of the case (frame) 800g that supports the peripheral edge part of the light-transmissive protection plate 30.

The case 800g of the mobile phone 800 has a dent 800ga that is formed as an area part that supports the peripheral edge part of the light-transmissive protection plate 30. The peripheral edge part of the light-transmissive protection plate 30 is fitted in the dent 800ga of the case 800g so that the case 800g supports the liquid crystal device 100. In some cases, another light source 12x that is not the aforementioned light source 12 is provided inside the case 800g for use other than the lighting of the liquid crystal device 100. It is possible that such another light source 12x is provided in a gap space 800k between the case 800g and the liquid crystal display panel 10 so as to overlap the coloration layer 40.

In such a configuration, there is an adverse possibility that a beam of light Lx emitted from the light source 12x propagates toward an area A5 of the coloration layer 40, which corresponds to the area of the gap 800k. As a result, the leakage of the beam of light Lx to the display side occurs at the area A5. For the prevention of such optical leakage, in the configuration of the liquid crystal device 100e according to this modification example, the first light-shielding layer 41 is formed on the liquid-crystal-display-panel-side (10) surface of the coloration layer 40 at the area A5 where the adhesive material 50 is not provided so as to cover the gap 800k. With the light-shielding structure explained above, it is possible to perfectly shield the beam of leakage light Lx that was emitted from the light source 12x and propagates toward the display side by means of the case 800g, the first light-shielding layer 41, and the second light-shielding layer 5. Therefore, it is possible to prevent the beam of leakage light Lx from being transmitted through the coloration layer 40. Consequently, it is possible to avoid the deterioration of the color-rendering properties of the coloration layer 40 and to improve the design quality of the light-transmissive protection plate 30 by means of the coloration layer 40.

There is a possibility that a gap is formed between the case 800g and the first light-shielding layer 41, though it is not supposed to, due to reasons such as aged deterioration, precision in positional determination during the process of manufacturing the liquid crystal device 100e, or other reasons, which results in the formation of a gap area at which the coloration layer 40 only is provided between the case 800g and the first light-shielding layer 41. As a result, the leakage of the beam of light Lx that was emitted from the light source 12x to the display side may occur at the gap area. As a technical solution to such a problem, it is preferable that the first light-shielding layer 41 should be formed on the liquid-crystal-display-panel-side (10) surface of the coloration layer 40 at an entire area outside the area A3, that is, not only at the area A5 where the adhesive material 50 is not provided but also at an area A6 that is outside the area A5. When the light-transmissive protection plate 30 of the liquid crystal device 100e according to this modification example is attached to the case 800g in the manufacturing of the mobile phone 800, the light-transmissive protection plate 30 is fixed to the case 800g with the surface of the A6-area part of the coloration layer 40, which is located outside the light-shielding-layer (41) area part thereof, being in contact with the surface of the dent 800ga of the case 800g.

In order to obtain the same advantageous effects as those offered by the liquid crystal device 100a according to a modification example of the first embodiment of the invention, the first light-shielding layer 41 and the second light-shielding layer 5 may partially overlap each other when viewed in plan in the configuration of the liquid crystal device 100e according to this modification example.

Next, with reference to FIG. 8B, the configuration of a liquid crystal device 100f according to another modification example of an exemplary embodiment of the invention, including but not limited to its mounting structure, is explained below. The structure of the attachment of the light-transmissive protection plate 30 to the case 800g of the mobile phone 800 in the configuration of the liquid crystal device 100f according to this modification example is different from the structure of the attachment of the light-transmissive protection plate 30 to the case 800g of the mobile phone 800 in the configuration of the liquid crystal device 100e according to the above modification example explained while referring to FIG. 8A.

FIG. 8B is an enlarged sectional view that schematically illustrates an example of the essential components of the liquid crystal device 100f according to still another modification example of an exemplary embodiment of the invention; specifically, FIG. 8B shows a partial section that corresponds to the partial section shown in FIG. 8A.

The configuration of a light-transmissive protection plate 30x according to this modification example differs from that of the light-transmissive protection plate 30 explained above in that, in the former configuration, a dent 30k is formed at the peripheral edge part in the display-side surface thereof. Except for such a difference, the configuration of the light-transmissive protection plate 30x is the same as that of the light-transmissive protection plate 30 explained above. The configuration of a case 800gx of the mobile phone 800 according to this modification example differs from that of the case 800g of the mobile phone 800 explained above in that, in the former configuration, a convex part 800gt that protrudes toward the light-transmissive protection plate 30x is formed as a display-side surface part thereof. Except for such a difference, the configuration of the case 800gx is the same as that of the case 800g explained above. When the light-transmissive protection plate 30x of the liquid crystal device 100f according to this modification example is attached to the case 800gx in the manufacturing of the mobile phone 800, the light-transmissive protection plate 30x is fixed to the case 800gx with the surface of the convex part 800gt of the case 800gx being in contact with the surface of the dent 30k of the light-transmissive protection plate 30x. The light source 12x mentioned in the explanation of the foregoing modification example, which is not the light source 12, is provided in a gap space 800k between the case 800gx and the liquid crystal display panel 10 in such a manner that the light source 12x overlaps the coloration layer 40 when viewed in plan.

In such a configuration, there is an adverse possibility that a beam of light Lx emitted from the light source 12x propagates toward an area A7 of the coloration layer 40, which is located at the area of the gap 800k. As a result, the leakage of the beam of light Lx to the display side occurs at the area A7. For the prevention of such optical leakage, in the configuration of the liquid crystal device 100f according to this modification example, the first light-shielding layer 41 is formed on the liquid-crystal-display-panel-side (10) surface of the coloration layer 40 at the area A7 where the adhesive material 50 is not provided so as to cover the gap 800k. That is, the first light-shielding layer 41 is formed on the liquid-crystal-display-panel-side (10) surface of the coloration layer 40 at the area A7 where the first light-shielding layer 41 and the convex part 800gt of the case 800gx do not overlap each other.

With the light-shielding structure explained above, it is possible to perfectly shield the beam of leakage light Lx that was emitted from the light source 12x and propagates toward the display side by means of the protruding part 800gt of the case 800gx, the first light-shielding layer 41, and the second light-shielding layer 5. Therefore, it is possible to prevent the beam of leakage light Lx from being transmitted through the coloration layer 40. Consequently, it is possible to avoid the deterioration of the color-rendering properties of the coloration layer 40 and to improve the design quality of the light-transmissive protection plate 30x by means of the coloration layer 40.

There is a possibility that a gap is formed between the protruding part 800gt of the case 800gx and the first light-shielding layer 41, though it is not supposed to, due to reasons such as aged deterioration, precision in positional determination during the process of manufacturing the liquid crystal device 100f, or other reasons, which results in the formation of a gap area at which the coloration layer 40 only is provided between the protruding part 800gt of the case 800gx and the first light-shielding layer 41. As a result, the leakage of the beam of light Lx that was emitted from the light source 12x to the display side may occur at the gap area. As a technical solution to such a problem, it is preferable that the first light-shielding layer 41 should be formed on the liquid-crystal-display-panel-side (10) surface of the coloration layer 40 at an entire area outside the area A3, that is, not only at the area A7 where the adhesive material 50 is not provided but also at an area A8 that is outside the area A7.

In order to obtain the same advantageous effects as those offered by the liquid crystal device 100a according to a modification example of the first embodiment of the invention, the first light-shielding layer 41 and the second light-shielding layer 5 may partially overlap each other when viewed in plan in the configuration of the liquid crystal device 100f according to this modification example.

As another example of the modified configuration of the liquid crystal device 100e or 100f, as a substitute for the second light-shielding layer 5, the third light-shielding layer 13 may be formed at the area A3 on the emitting plane 11b of the optical waveguide board 11 of the illumination device 20, which constitutes the liquid-crystal-display-panel-side (10) surface. That is, the third light-shielding layer 13 may be formed in place of the second light-shielding layer 5 so as to overlap a part of the coloration layer 40 that does not overlap the first light-shielding layer 41 at all or at least the part of the coloration layer 40 when viewed in plan. As still another example of the modified configuration thereof, the liquid crystal device 100e or 100f may be provided with both of the second light-shielding layer 5 and the third light-shielding layer 13.

In the foregoing description of exemplary embodiments of the invention and modification examples thereof, it is explained that the coloration layer 40 is formed at the area A1 that is outside the effective image display area V on the liquid-crystal-display-panel-side surface of the light-transmissive protection plate 30 or 30x. However, the scope of this aspect of the invention is not limited to such an exemplary structure. For example, in the configuration of a liquid crystal device according to any exemplary embodiment of the invention or modification example thereof, the coloration layer 40 may be formed at the area A1 that is outside the effective image display area V on the other surface of the light-transmissive protection plate that is opposite to the liquid-crystal-display-panel-side surface thereof. That is, it suffices if the coloration layer 40 is formed at the area outside the effective image display area V on either surface of the light-transmissive protection plate.

In the configuration of a liquid crystal device according to an exemplary embodiment of the invention or a modification example thereof, as explained earlier, various kinds of optical sheets such as a prism sheet or a light diffusion sheet may be formed on the liquid-crystal-display-panel-side (10 or 10a) surface of the optical waveguide board 11 of the illumination device 20 or 20a. In such a configuration, the area size of the optical sheet may be substantially the same as that of the optical waveguide board 11. Or, the area size of the optical sheet may be slightly smaller than that of the optical waveguide board 11. In such a configuration, it is preferable that the light-shielding layer (the third light-shielding layer) 13 should be formed at the area A3 on the liquid-crystal-display-panel-side surface of the optical sheet so as to overlap a part of the coloration layer 40 that does not overlap the first light-shielding layer 41 at all when viewed in plan.

In the foregoing description of exemplary embodiments of the invention and modification examples thereof, a liquid crystal display panel is taken as an example of an electro-optical panel according to an aspect of the invention. However, needless to say, the scope of this aspect of the invention is not limited to such a specific example. For example, the electro-optical panel may be embodied as and/or applied to various kinds of well-known display devices including but not limited to an organic electroluminescence (EL) display device, electronic paper, a plasma display device, or a field emission display device. When the electro-optical panel is embodied as and/or applied to a well-known display device such as one of them enumerated above, the illumination device may be provided at a non-display side that is opposite to the display side of the display device.

Examples of Application to Touch Panel

Figure 9:
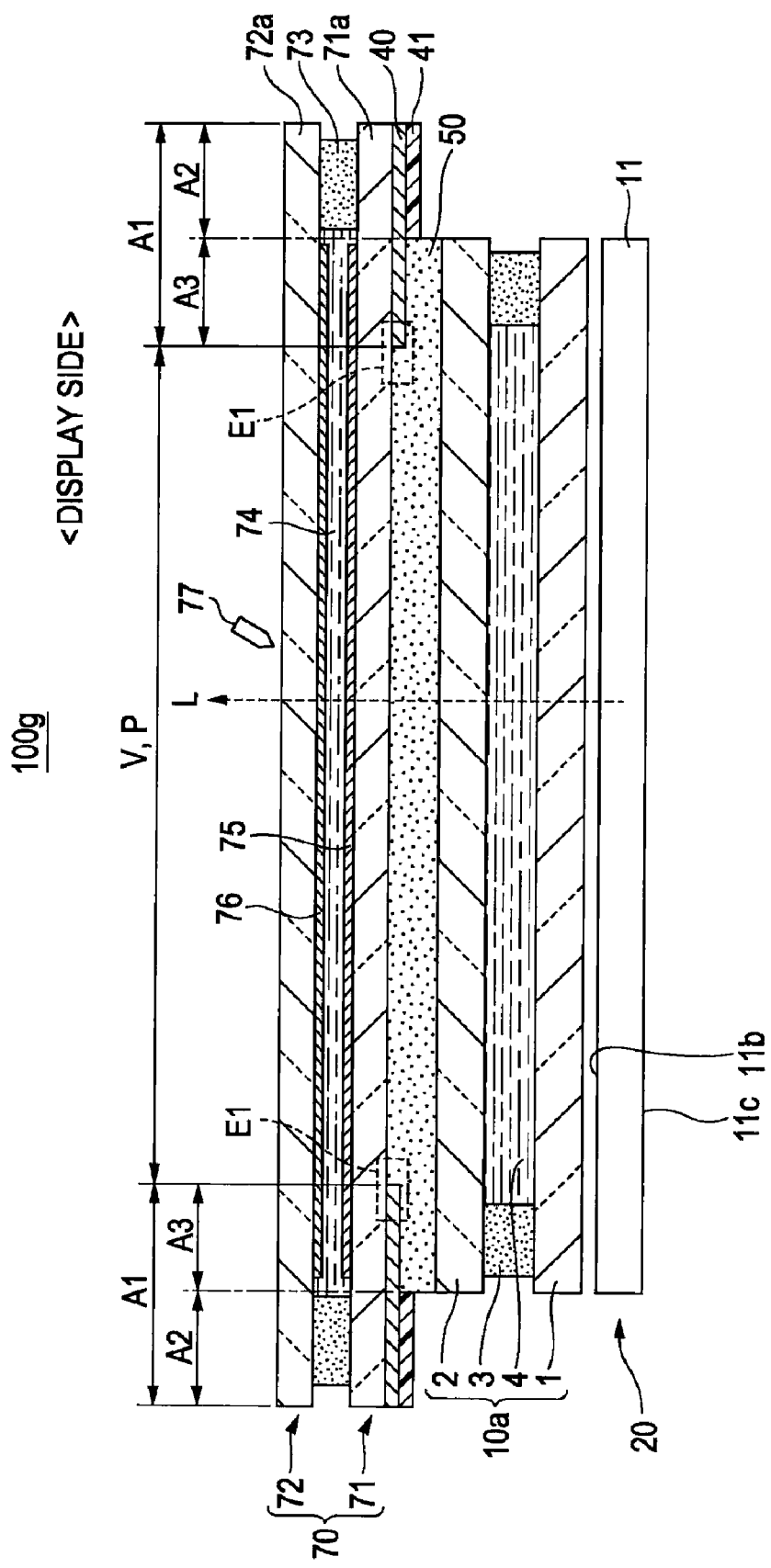
FIG. 9 is a sectional view that schematically illustrates an example of the layer structure of a touch-panel liquid crystal device according to a modification example of an exemplary embodiment of the invention corresponding to FIG. 2.

Next, with reference to FIG. 9, an explanation is given below of an exemplary configuration and other features of a liquid crystal device 100g according to another modification example of the invention. In the following description of the liquid crystal device 100g according to another modification example of the invention, the same reference numerals are consistently used for the same components as those of a liquid crystal device according to the foregoing exemplary embodiments of the invention so as to omit, if appropriate, any redundant explanation or simplify explanation thereof. FIG. 9 is a sectional view that schematically illustrates an example of the layer structure of the liquid crystal device 100g according to another modification example of the invention, which is taken along a section line corresponding to that of the liquid crystal device 100 explained earlier while referring to FIG. 2. An area P that is shown in FIG. 9 is an effective position coordinate input area, which is hereafter simply referred to as "input area P". The input area P is an area that contributes to touch inputting. An area A1 outside the input area P shown therein is a non-effective position coordinate input area, which does not contribute to touch inputting.

The liquid crystal device 100g according to this modification example of the invention is provided with the liquid crystal display panel 10a, a resistive film touch panel 70, the illumination device 20, the coloration layer 40, and the adhesive material 50 as the main components thereof. The resistive film touch panel 70 is provided at the display-surface side of the liquid crystal display panel 10a in such a manner that the resistive film touch panel 70 and the liquid crystal display panel 10a overlap each other when viewed in plan. The resistive film touch panel 70 that is described herein is a non-limiting example of a light-transmissive member according to an aspect of the invention. The illumination device 20 is provided at the other side of the liquid crystal display panel 10a that is opposite to the display-surface side thereof. That is, the configuration of the liquid crystal device 100g according to this modification example of the invention differs from the configuration of a liquid crystal device according to the foregoing exemplary embodiments of the invention in that, in the former configuration, the touch panel 70 is used as a light-transmissive member. The same configuration as that of a liquid crystal device according to the foregoing exemplary embodiments of the invention can be adopted for all other components including but not limited to the liquid crystal display panel and the illumination device.

An example of the configuration of the touch panel 70 is explained below.

The touch panel 70 includes a first substrate 71, a second substrate 72, a sealant 73, and a liquid material 74. The first substrate 71 is provided at the liquid-crystal-display-panel (10a) side. The second substrate 72 is provided opposite to the first substrate 71. The sealing material 73 is provided in the shape of a frame between the first substrate 71 and the second substrate 72 that are pasted or bonded in any other way to each other. The liquid material 74 is sealed in a space that is demarcated by the frame-shaped sealant 3 to be used for adjusting the index of refraction. It is preferable to use a liquid material that has a small difference in the index of refraction between the material and glass; and it is further preferable that the difference should be smaller than that of air. An example of the preferred liquid material 74 is silicon oil, though not limited thereto.

The first substrate 71 includes a substrate substance 71a that is made of a light-transmissive material such as hard glass or the like. A first planar electrode 75 is formed on the inner surface of the substrate substance 71a of the first substrate 71, which is a surface that is in contact with the liquid material 74. The first planar electrode 75 has a rectangular shape when viewed in plan. The first planar electrode 75 is made of a light-transmissive conductive film such as ITO or the like. The first planar electrode 75 functions as a resistive film. Being formed as a thin film, the first planar electrode 75 has almost uniform surface resistance throughout the entire surface area thereof. The first planar electrode 75 is formed on the inner surface of the substrate substance 71a of the first substrate 71 so as to cover an area corresponding to the effective image display area V of the liquid crystal display panel 10a.

On the other hand, the second substrate 72 has a substrate substance 72a that is made of the same material as that of the substrate substance 71a of the first substrate 71. A second planar electrode 76 is formed on the inner surface of the substrate substance 72a of the second substrate 72, which is a surface that is in contact with the liquid material 74. The second planar electrode 76 has a rectangular shape when viewed in plan. The second planar electrode 76 is made of a light-transmissive conductive film such as ITO or the like. The second planar electrode 76 functions as another resistive film. Being formed as a thin film, the second planar electrode 76 has almost uniform surface resistance throughout the entire surface area thereof. The second planar electrode 76 is formed on the inner surface of the substrate substance 72a of the second substrate 72 so as to cover an area corresponding to the effective image display area V of the liquid crystal display panel 10a.

In the configuration of the liquid crystal device 100g explained above, the input area P of a touch surface of the second substrate 72 that is opposite to the liquid-material-side (74) surface constitutes a coordinate input surface. That is, the input area P of the touch surface of the second substrate 72 that corresponds to the effective image display area V of the liquid crystal display panel 10a constitutes the coordinate input surface. The coordinate input surface is a plane on which input operation is performed by pointing a position over a touch panel with the use of an input device 77, a finger, or the like. That is, the touch panel 70 has a first area, which is an area that corresponds to the effective image display area V of the liquid crystal display panel 10a (i.e., input area P), and a second area that is located outside the first area. When a certain position on the coordinate input plane is depressed with the tip of the input device 77, a finger, or the like, the second substrate 72 becomes deflected toward the first substrate 71 so that a positional part of the second planar electrode 76, which is formed on the second substrate 72, is brought into contact with the corresponding part of the first planar electrode 75, which is formed on the first substrate 71. An electric connection is established at the contact position. Depending on the contact position in the input area P, the resistance value of the first planar electrode 75 and the second planar electrode 76 varies. A position coordinate corresponding to the contact position in the input area P is detected on the basis of a change in the resistance value, which occurs as explained above.

The coloration layer 40 is formed at the area A1 that is outside the effective image display area V on a surface of the first substrate 71 of the touch panel 70 that faces toward the liquid crystal display panel 10a. However, the scope of this aspect of the invention is not limited to such an exemplary structure. For example, the coloration layer 40 may be formed at the area A1 that is outside the effective image display area V on the touch surface of the second substrate 72 of the touch panel 70 that is opposite to the liquid-crystal-display-panel-side (i.e., liquid-material-side) surface thereof.

That is, the adhesive material 50 is provided between a part of the coloration layer 40 (area A3) and the corresponding part of the liquid crystal display panel 10a as well as between the first-area part of the touch panel 70 and the corresponding part of the liquid crystal display panel 10a so as to offer tight adhesive contact therebetween.

In the configuration of the liquid crystal device 100g according to this modification example, the dimension of the touch panel 70 is larger than that of the liquid crystal display panel 10a. Accordingly, a peripheral edge part of the touch panel 70 is positioned outside the edge of the liquid crystal display panel 10a as a protruding part. Notwithstanding the above, however, the relative dimensions of the liquid crystal display panel 10a and the touch panel 70 is not limited to such a specific example.

Light Leakage Prevention Structure of Liquid Crystal Device

In the configuration of the liquid crystal device 100g according to this modification example, the first light-shielding layer 41 is formed over the surface of the first substrate 71 of the touch panel 70 that faces toward the liquid crystal display panel 10a at the area A2 where the coloration layer 40 does not overlap the adhesive material 50 at all in a plan view.

When a beam of light L that was emitted from the illumination device 20 propagates toward the coloration layer 40, the first light-shielding layer 41 shuts off the emitted light L during the operation of the liquid crystal device 100g. Since the first light-shielding layer 41 shuts off the emitted light L, the light L is not transmitted through the coloration layer 40. Therefore, it is possible to prevent a beam of light from leaking toward the display side at the area corresponding to the coloration layer 40. Therefore, it is possible to avoid the deterioration of the color-rendering properties of the coloration layer 40. Consequently, the design quality of the touch panel 70 is enhanced by means of the coloration layer 40.

Structure for Preventing Degradation in Display Quality of Liquid Crystal Device As explained above, in the configuration of the liquid crystal device 100g according to this modification example, the adhesive material 50 is provided between a part of the coloration layer 40 (area A3) and the corresponding part of the liquid crystal display panel 10a as well as between the first-area part of the touch panel 70 and the corresponding part of the liquid crystal display panel 10a so as to offer tight adhesive contact therebetween. In addition, the coloration layer 40 is formed as a very thin layer. Therefore, a difference in level between the surface of the coloration layer 40 and the surface of the touch panel 70 at the area where the coloration layer 40 is not formed is small. In a preferred configuration example, the adhesive material 50 is made of a substance that can be elastically deformed to some degree. Because of the structure explained above, it is substantially less likely that air bubbles are produced at the level-difference area part when the liquid crystal display panel 10a and the touch panel 70 are bonded to each other with the use of the adhesive material 50. Therefore, it is possible to avoid poor display quality due to a difference in the index of refraction of any air bubble and the index of refraction of the touch panel 70 and the like.

Moreover, since the level difference is small, a distance between the liquid crystal display panel 10a and the touch panel 70 is not large. Therefore, there is no risk at all or almost no risk that a stress is applied to the liquid crystal display panel 10a in a direction of pulling the liquid crystal display panel 10a toward the touch panel 70 due to the adhesion force of the adhesive material 50 when the liquid crystal display panel 10a and the touch panel 70 are bonded to each other with the use of the adhesive material 50. In addition, no stress that causes the liquid crystal display panel 10a to be deflected under the pulling force is applied to the liquid crystal display panel 10a. For this reason, it is possible to avoid the occurrence of display unevenness or other image problems due to the deflection of the liquid crystal display panel 10a. Thus, it is further possible to prevent the quality of display images from being adversely affected thereby.

If the coloration layer 40 is formed at the area A1 that is outside the effective image display area V on the touch surface of the second substrate 72 of the touch panel 70 that is opposite to the liquid-crystal-display-panel-side (10) surface thereof, the coloration layer 40 and the first light-shielding layer 41 do not exist between the adhesive material 50 and the touch panel 70. In other words, there is not any level difference between the adhesive material 50 and the touch panel 70 because the coloration layer 40 and the first light-shielding layer 41 do not exist between the adhesive material 50 and the touch panel 70 in such a modified layer structure. Therefore, when the liquid crystal display panel 10a and the touch panel 70 are bonded to each other by means of the adhesive material 50, it is substantially less likely that air bubbles are produced between the touch panel 70 and the adhesive material 50. For this reason, it is possible to avoid poor display quality due to a difference in the index of refraction of any air bubble and the index of refraction of the touch panel 70 and the like.

The scope of touch-panel application of the invention is not limited to a resistive film type. That is, an aspect of the invention can be applied to various types of touch panels. As an example of the application of an aspect of the invention to a type of touch panel other than a resistive film touch panel, an exemplary configuration and other features of an electrostatic capacitance touch panel are explained below while referring to FIG. 10. In the following description of a liquid crystal device according to still another modification example of the invention, the same reference numerals are consistently used for the same components as those of a liquid crystal device according to the foregoing exemplary embodiments of the invention so as to omit, if appropriate, any redundant explanation or simplify explanation thereof.

Figure 10:
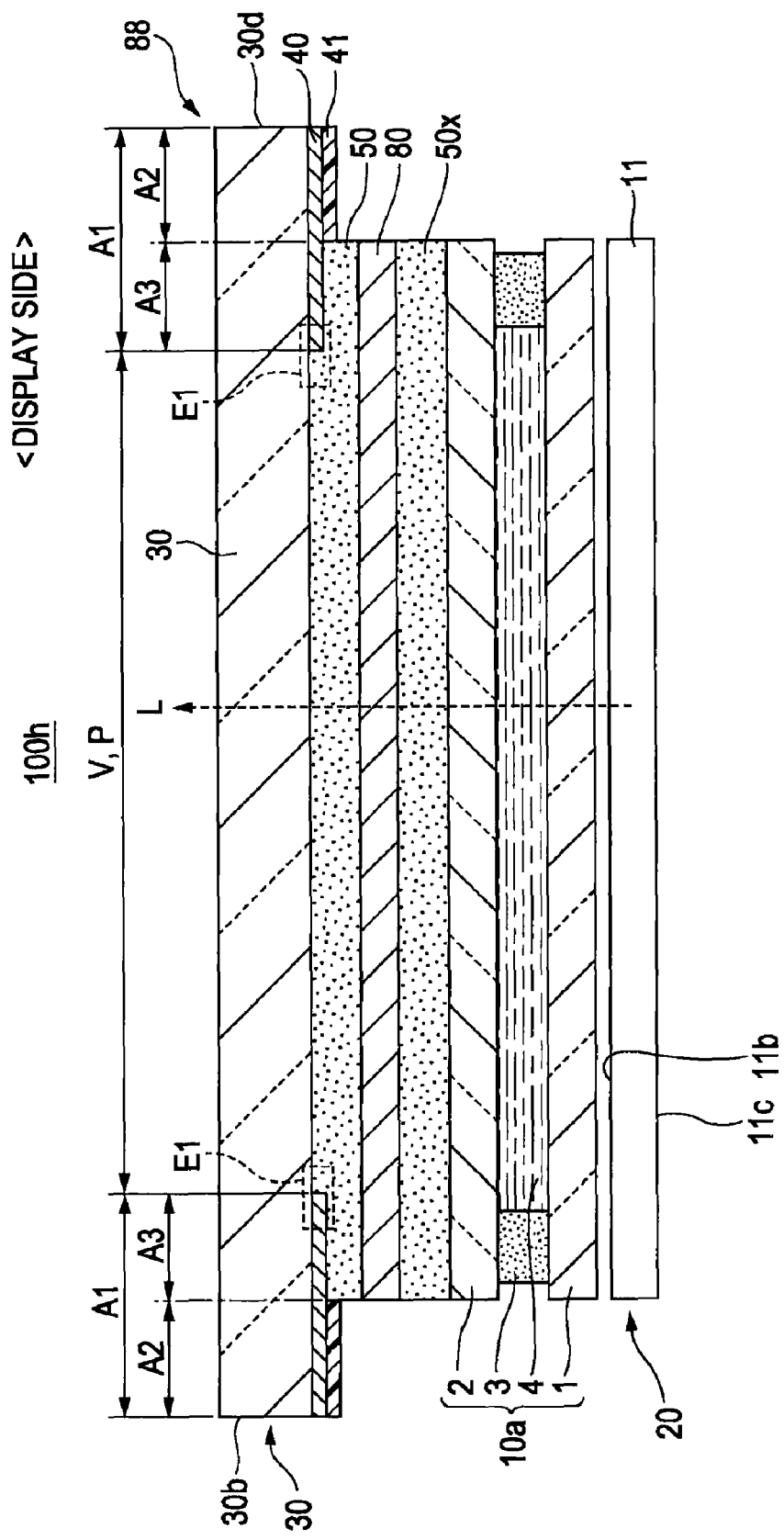
FIG. 10 is a sectional view that schematically illustrates an example of the layer structure of a touch-panel liquid crystal device according to another modification example of an exemplary embodiment of the invention corresponding to FIG. 2.

FIG. 10 is a sectional view that schematically illustrates an example of the layer structure of a liquid crystal device 100h according to still another modification example of the invention, which is taken along a section line corresponding to that of the liquid crystal device 100 explained earlier while referring to FIG. 2. An area P that is shown in FIG. 10 is an effective position coordinate input area, which is referred to as the input area P as defined above. The input area P is an area that contributes to touch inputting. An area A1 outside the input area P shown therein is a non-effective position coordinate input area, which does not contribute to touch inputting.

The liquid crystal device 100h according to this modification example of the invention is provided with the liquid crystal display panel 10a, the illumination device 20, and an input device 88 as the main components thereof. The illumination device 20 is provided at the other side of the liquid crystal display panel 10a that is opposite to the display-surface side thereof. The input device 88 is provided at the display-surface side of the liquid crystal display panel 10a.

The input device 88 includes a touch panel 80, the light-transmissive protection plate 30, the coloration layer 40, and the adhesive material 50. The touch panel 80 has the input area P that corresponds to the effective image display area V of the liquid crystal display panel 10a. The touch panel 80 that is described herein is a non-limiting example of a light-transmissive member according to an aspect of the invention. The light-transmissive protection plate 30 has a function of protecting the touch panel 80 against an external force such as a pressing force, a shock, and the like that is applied from the outside. The light-transmissive protection plate 30 that is described herein is also a non-limiting example of a light-transmissive member according to an aspect of the invention. The touch panel 80 detects a human body capacitance. That is, the touch panel 80 is a so-called electrostatic capacitance touch panel that detects a change in surface charge that occurs when a user touches the touch panel 80 directly, thereby detecting a contact position in the input area P. The touch panel 80 is pasted or bonded in any other way to the liquid crystal display panel 10a by means of an adhesive substance 50x that is made of the same material as that of the adhesive substance 50. The configuration of the liquid crystal device 100h according to this modification example of the invention differs from the configuration of a liquid crystal device according to the foregoing exemplary embodiments of the invention in the features explained above. The same configuration as that of a liquid crystal device according to the foregoing exemplary embodiments of the invention can be adopted for the liquid crystal display panel and the illumination device thereof. The touch panel 80 has a first area, which is an area that corresponds to the effective image display area V of the liquid crystal display panel 10a (i.e., input area P), and a second area that is located outside the first area. The light-transmissive protection plate 30 also has the first area corresponding to the effective image display area V and the second area that is located outside the first area.

The coloration layer 40 is formed at the area A1 that is outside the effective image display area V on a surface of the light-transmissive protection plate 30 that faces toward the liquid crystal display panel 10a and the touch panel 80. However, the scope of this aspect of the invention is not limited to such an exemplary structure. For example, the coloration layer 40 may be formed at the area A1 that is outside the effective image display area V on the other surface of the light-transmissive protection plate 30 that is opposite to the surface thereof that faces toward the liquid crystal display panel 10a and the touch panel 80.

The adhesive material 50 is provided between a part of the coloration layer 40 (area A3) and the corresponding part of the touch panel 80 as well as between the first-area part of the light-transmissive protection plate 30 and the corresponding part of the touch panel 80 so as to offer tight adhesive contact therebetween. The adhesive material 50x is provided as a gluing layer between the touch panel 80 and the liquid crystal display panel 10a so as to keep the touch panel 80 and the liquid crystal display panel 10a in tight adhesive contact with each other.

In the configuration of the liquid crystal device 100h according to this modification example, the dimension of the light-transmissive protection plate 30 is larger than that of the liquid crystal display panel 10a. Accordingly, a peripheral edge part of the light-transmissive protection plate 30 is positioned outside the edge of the liquid crystal display panel 10a as a protruding part. Notwithstanding the above, however, the relative dimensions of the liquid crystal display panel 10a and the light-transmissive protection plate 30 is not limited to such a specific example.

Light Leakage Prevention Structure of Liquid Crystal Device

In the configuration of the input device 88 of the liquid crystal device 100h according to this modification example, the first light-shielding layer 41 is formed over the surface of the light-transmissive protection plate 30 that faces toward the touch panel 80 and the liquid crystal display panel 10a at the area A2 where the coloration layer 40 does not overlap the adhesive material 50 at all in a plan view.

When a beam of light L that was emitted from the illumination device 20 propagates toward the coloration layer 40, the first light-shielding layer 41 shuts off the emitted light L during the operation of the liquid crystal device 100h. Since the first light-shielding layer 41 shuts off the emitted light L, the light L is not transmitted through the coloration layer 40. Therefore, it is possible to prevent a beam of light from leaking toward the display side at the area corresponding to the coloration layer 40. Therefore, it is possible to avoid the deterioration of the color-rendering properties of the coloration layer 40. Consequently, the design quality of the light-transmissive protection plate 30 is enhanced by means of the coloration layer 40.

Structure for Preventing Degradation in Display Quality of Liquid Crystal Device In the configuration of the liquid crystal device 100h according to this modification example, the adhesive material 50 is provided between a part of the coloration layer 40 (area A3) and the corresponding part of the touch panel 80 as well as between the first-area part of the light-transmissive protection plate 30 and the corresponding part of the touch panel 80 so as to offer tight adhesive contact therebetween. In addition, the coloration layer 40 is formed as a very thin layer. Therefore, a difference in level between the surface of the coloration layer 40 and the surface of the light-transmissive protection plate 30 at the area where the coloration layer 40 is not formed is small. In a preferred configuration example, the adhesive material 50 is made of a substance that can be elastically deformed to some degree. Because of the structure explained above, it is substantially less likely that air bubbles are produced at the level-difference area part when the light-transmissive protection plate 30 and the touch panel 80 are bonded to each other with the use of the adhesive material 50. Therefore, it is possible to avoid poor display quality due to a difference in the index of refraction of any air bubble and the index of refraction of the light-transmissive protection plate 30 and the like.

Moreover, since the level difference is small, a distance between the light-transmissive protection plate 30 and the touch panel 80 is not large. Therefore, there is no risk at all or almost no risk that a stress is applied to the touch panel 80 in a direction of pulling the touch panel 80 toward the light-transmissive protection plate 30 due to the adhesion force of the adhesive material 50 when the light-transmissive protection plate 30 and the touch panel 80 are bonded to each other with the use of the adhesive material 50. In addition, no stress that causes the touch panel 80 to be deflected under the pulling force is applied to the touch panel 80. Consequently, it is possible to correctly detect a point of finger contact (i.e., position coordinate) or other touch contact in the input area P through the operation of the input device 88.

If the coloration layer 40 is formed at the area A1 that is outside the effective image display area V on the other surface of the light-transmissive protection plate 30 that is opposite to the touch-panel-side (80) surface thereof, the coloration layer 40 and the first light-shielding layer 41 do not exist between the adhesive material 50 and the light-transmissive protection plate 30. In other words, there is not any level difference between the adhesive material 50 and the light-transmissive protection plate 30 because the coloration layer 40 and the first light-shielding layer 41 do not exist between the adhesive material 50 and the light-transmissive protection plate 30 in such a modified layer structure. Therefore, when the light-transmissive protection plate 30 and the touch panel 80 are bonded to each other by means of the adhesive material 50, it is substantially less likely that air bubbles are produced between the light-transmissive protection plate 30 and the adhesive material 50. For this reason, it is possible to avoid poor display quality due to a difference in the index of refraction of any air bubble and the index of refraction of the light-transmissive protection plate 30 and the like.

The entire disclosure of Japanese Patent Application No. 2008-103103, filed Apr. 11, 2008 is expressly incorporated by reference herein.

What is claimed is:

1. An electro-optical device comprising:
    an electro-optical panel that has an effective display area;
    a light-transmissive member that overlaps the electro-optical panel in a plan view and has a protruding part that protrudes so as to be positioned outside an edge of the electro-optical panel, the light-transmissive member having a first area that corresponds to the effective display area of the electro-optical panel and a second area that is located outside the first area;
    a coloration layer that is formed on a surface of the light-transmissive member at the second area;
    an adhesive material that is provided between a part of the coloration layer and a corresponding part of the electro-optical panel as well as between the first-area part of the light-transmissive member and a corresponding part of the electro-optical panel so as to offer tight adhesive contact therebetween; and
    a first light-shielding layer formed over one surface of the light-transmissive member, the surface facing the electro-optical panel, and the first light-shielding layer being formed at an area where the coloration layer does not overlap the adhesive material in a plan view.

2. The electro-optical device according to claim 1, wherein the electro-optical panel includes a second light-shielding layer that is formed at an area so as to overlap the coloration layer when viewed in plan.

3. The electro-optical device according to claim 1, further comprising an illumination device that is provided at one surface side of the electro-optical panel that is opposite to the other surface side thereof that faces toward the light-transmissive member and/or is closer to the light-transmissive member than the one surface side, the illumination device being provided with a light source.

4. The electro-optical device according to claim 3, wherein the illumination device includes a third light-shielding layer that is formed at an area so as to overlap the coloration layer when viewed in plan.

5. The electro-optical device according to claim 2, wherein the first light-shielding layer and the second light-shielding layer partially overlap each other when viewed in plan.

6. The electro-optical device according to claim 4, wherein the first light-shielding layer and the third light-shielding layer partially overlap each other when viewed in plan.

7. The electro-optical device according to claim 2, wherein the electro-optical panel includes a pair of substrates and an electro-optical material that is sandwiched between the pair of substrates; and the second light-shielding layer is formed on at least one of the pair of substrates.

8. The electro-optical device according to claim 1, wherein the light-transmissive member is a light-transmissive protection plate that protects the electro-optical panel against an external force, which is applied from the outside.

9. The electro-optical device according to claim 1, wherein the light-transmissive member is a touch panel.

10. The electro-optical device according to claim 1, wherein the light-transmissive member includes a touch panel and a light-transmissive protection plate that protects the touch panel against an external force, which is applied from the outside.

11. An electronic apparatus that is provided with the electro-optical device according to claim 1, the electro-optical device functioning as a display section of the electronic apparatus.

12. An electronic apparatus comprising:
    the electro-optical device according to claim 3;
    a frame that supports a peripheral edge part of the light-transmissive member; and
    another light source that is provided inside the frame,
    wherein a gap is formed between the frame and the electro-optical panel;
    another light source mentioned above is provided at a position corresponding to the gap; and
    at least a part of the first light-shielding layer is provided at an area that at least covers the gap.

* * * * *